(12) United States Patent
Mathew et al.

(10) Patent No.: US 10,009,525 B2
(45) Date of Patent: Jun. 26, 2018

(54) CAMERA LENS STRUCTURES AND DISPLAY STRUCTURES FOR ELECTRONIC DEVICES

(71) Applicant: Apple Inc., Cupertino, CA (US)

(72) Inventors: Dinesh C. Mathew, Fremont, CA (US); Keith J. Hendren, Capitola, CA (US); Thomas W. Wilson, Jr., Saratoga, CA (US); Adam T. Garelli, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days. days.

(21) Appl. No.: 14/858,695

(22) Filed: Sep. 18, 2015

(65) Prior Publication Data

US 2016/0212311 A1    Jul. 21, 2016

Related U.S. Application Data

(63) Continuation of application No. 12/916,475, filed on Oct. 29, 2010, now Pat. No. 9,143,668.

(51) Int. Cl.
*H04N 5/225* (2006.01)
*G06F 1/16* (2006.01)
*G02F 1/1335* (2006.01)

(52) U.S. Cl.
CPC ..... *H04N 5/2254* (2013.01); *G02F 1/133528* (2013.01); *G06F 1/1605* (2013.01);
(Continued)

(58) Field of Classification Search
None
See application file for complete search history.

(56) References Cited

U.S. PATENT DOCUMENTS 3,429,997 A   2/1969  Rosner
4,528,010 A   7/1985  Edahiro
(Continued)

FOREIGN PATENT DOCUMENTS

CN   1573531 A   2/2005
JP   H06245209 A   9/1994
(Continued)

OTHER PUBLICATIONS

"LCD With Embedded Camera for Picture Telephone," IBM Corporation Research Disclosure 42572 Sep. 1999.
(Continued)

*Primary Examiner* — Dennis Hogue
(74) *Attorney, Agent, or Firm* — Blank Rome LLP

(57) ABSTRACT

A camera may be mounted under a display in an electronic device. The display may include a polarizer layer, a color filter layer, and a thin-film-transistor layer. A layer of material such as a glass insert may be attached to an edge of the display. Openings may be formed in the layers of the display and the insert to accommodate the camera. A sleeve structure may be mounted within an opening. The camera may include lens structures formed from a stack of lens elements. One or more layers of the display may be interposed within the lens structures. The glass insert may be mounted within a notch in the color filter layer and thin-film transistor layer or along a straight edge of the color filter layer and thin-film transistor layer. The edge of the color filter layer may be recessed with respect to form a mounting shelf for the insert.

12 Claims, 25 Drawing Sheets

(52) U.S. Cl.
CPC ......... *G06F 1/1686* (2013.01); *H04N 5/2251* (2013.01); *H04N 5/2253* (2013.01); *G02F 2201/58* (2013.01)

(56) References Cited

U.S. PATENT DOCUMENTS

| | | | |
|---|---|---|---|
| 4,769,680 A | 9/1988 | Resor, III | |
| 5,032,007 A | 7/1991 | Silverstein | |
| 5,040,069 A | 8/1991 | Matsumoto | |
| 5,359,206 A | 10/1994 | Yamamoto | |
| 5,436,635 A | 7/1995 | Takahara | |
| 5,481,430 A | 1/1996 | Miyagawa | |
| 5,517,278 A | 5/1996 | Takahara | |
| 5,539,550 A | 7/1996 | Spitzer | |
| 5,572,343 A | 11/1996 | Okamura | |
| 5,623,392 A | 4/1997 | Ma | |
| 5,678,483 A | 10/1997 | Johnson | |
| 5,708,561 A | 1/1998 | Huilgol | |
| 5,739,800 A | 4/1998 | Lebby | |
| 5,748,270 A | 5/1998 | Smith | |
| 5,760,858 A | 6/1998 | Hodson | |
| 5,815,197 A * | 9/1998 | Kakii | H04N 7/144 348/14.08 |
| 5,851,411 A | 12/1998 | An | |
| 5,889,568 A | 3/1999 | Seraphim | |
| 5,940,153 A | 8/1999 | Castaneda | |
| 5,965,916 A | 10/1999 | Chen | |
| 5,988,827 A | 11/1999 | Lee | |
| 5,990,986 A | 11/1999 | Song | |
| 6,061,179 A | 5/2000 | Inoguchi | |
| 6,104,461 A | 8/2000 | Zhang | |
| 6,145,984 A | 11/2000 | Farwig | |
| 6,278,504 B1 | 8/2001 | Sung | |
| 6,335,773 B1 | 1/2002 | Kamei | |
| 6,396,636 B2 | 5/2002 | Sawaki | |
| 6,483,498 B1 | 11/2002 | Colgan | |
| 6,483,719 B1 | 11/2002 | Bachman | |
| 6,525,786 B1 | 2/2003 | Ono | |
| 6,532,152 B1 | 3/2003 | White | |
| 6,552,769 B2 | 4/2003 | Cho | |
| 6,570,757 B2 | 5/2003 | DiFonzo | |
| 6,628,355 B1 | 9/2003 | Takahara | |
| 6,919,678 B2 | 7/2005 | Ozolins | |
| 6,940,564 B2 | 9/2005 | Murden | |
| 7,013,558 B2 | 3/2006 | Bachman | |
| 7,035,090 B2 | 4/2006 | Tanaka | |
| 7,133,104 B2 | 11/2006 | Kim | |
| 7,161,185 B2 | 1/2007 | Yamazaki | |
| 7,217,588 B2 | 5/2007 | Hartzell | |
| 7,230,272 B2 | 6/2007 | Itoh | |
| 7,245,333 B2 | 7/2007 | Nam | |
| 7,425,749 B2 | 9/2008 | Hartzell | |
| 7,489,291 B2 | 2/2009 | Yamazaki | |
| 7,522,236 B2 | 4/2009 | Gettemy | |
| 7,551,358 B2 | 6/2009 | Lee | |
| 7,569,410 B2 | 8/2009 | Hartzell | |
| 7,582,904 B2 | 9/2009 | Fujii | |
| 7,585,121 B2 | 9/2009 | Tsai | |
| 7,629,613 B2 | 12/2009 | Sohn | |
| 7,663,607 B2 | 2/2010 | Hotelling | |
| 7,697,052 B1 | 4/2010 | Yamazaki | |
| 7,728,906 B2 | 6/2010 | Bilbrey | |
| 7,728,937 B2 | 6/2010 | Kume | |
| 7,790,487 B2 | 9/2010 | Shih | |
| 7,812,920 B2 | 10/2010 | Iino | |
| 7,813,042 B2 | 10/2010 | Mather | |
| 7,821,561 B2 | 10/2010 | Tsuboi | |
| 7,830,370 B2 | 11/2010 | Yamazaki | |
| 7,852,440 B2 | 12/2010 | Kunimori | |
| 7,859,606 B2 | 12/2010 | Higaki | |
| 7,879,634 B2 | 2/2011 | Kaneko | |
| 7,894,021 B2 | 2/2011 | Yang | |
| 7,933,123 B2 | 4/2011 | Wang | |
| 7,936,346 B2 | 5/2011 | Kunimori | |
| 7,938,051 B2 | 5/2011 | Tannas | |
| 7,993,123 B2 | 8/2011 | Wigand | |
| 8,023,093 B2 | 9/2011 | Fukuda | |
| 8,049,221 B2 | 11/2011 | Komori | |
| 8,189,098 B2 | 5/2012 | Maruyama | |
| 8,588,605 B2 | 11/2013 | Harris | |
| 8,670,660 B2 | 3/2014 | Ichikawa | |
| 8,675,118 B2 | 3/2014 | Ryu | |
| 2001/0000676 A1 | 5/2001 | Zhang | |
| 2001/0019130 A1 | 9/2001 | Yamazaki | |
| 2002/0011978 A1 | 1/2002 | Yamazaki | |
| 2002/0051112 A1 | 5/2002 | Katsura | |
| 2002/0063253 A1 | 5/2002 | Hong | |
| 2003/0133070 A1 | 7/2003 | Nam | |
| 2003/0161093 A1 | 8/2003 | Lam | |
| 2004/0135275 A1 | 7/2004 | Chakrabarti | |
| 2004/0212555 A1 * | 10/2004 | Falco | G06F 1/1626 345/50 |
| 2004/0218081 A1 | 11/2004 | Lohr | |
| 2004/0263670 A1 | 12/2004 | Yamasaki | |
| 2005/0018121 A1 | 1/2005 | Jen | |
| 2005/0041166 A1 | 2/2005 | Yamazaki | |
| 2005/0073642 A1 | 4/2005 | Dunn | |
| 2005/0078252 A1 | 4/2005 | Lin | |
| 2005/0176151 A1 | 8/2005 | Park | |
| 2005/0195621 A1 | 9/2005 | Chang | |
| 2005/0214984 A1 | 9/2005 | Maruyama | |
| 2005/0264689 A1 * | 12/2005 | Yang | H04N 7/142 348/373 |
| 2005/0285996 A1 | 12/2005 | Nakamura | |
| 2006/0001802 A1 | 1/2006 | Kao | |
| 2006/0012969 A1 | 1/2006 | Bachman | |
| 2006/0033874 A1 | 2/2006 | Sakama | |
| 2006/0113894 A1 | 6/2006 | Fujii | |
| 2006/0125982 A1 | 6/2006 | Lin | |
| 2006/0138296 A1 | 6/2006 | DeLuga | |
| 2006/0146412 A1 | 7/2006 | Kim | |
| 2006/0148425 A1 | 7/2006 | Carlson | |
| 2006/0176417 A1 | 8/2006 | Wu | |
| 2006/0227232 A1 | 10/2006 | Zhang | |
| 2006/0279652 A1 | 12/2006 | Yang | |
| 2007/0109461 A1 | 5/2007 | Park | |
| 2007/0126966 A1 | 6/2007 | Takahashi | |
| 2007/0153177 A1 | 7/2007 | Zhang | |
| 2007/0189730 A1 | 8/2007 | Okamura | |
| 2007/0291172 A1 | 12/2007 | Kouzimoto | |
| 2008/0023780 A1 | 1/2008 | Jung | |
| 2008/0036942 A1 | 2/2008 | Hsieh | |
| 2008/0049004 A1 | 2/2008 | Kunimori | |
| 2008/0057604 A1 | 3/2008 | Tanaka | |
| 2008/0068484 A1 | 3/2008 | Nam | |
| 2008/0079860 A1 | 4/2008 | Kunimori | |
| 2008/0106628 A1 * | 5/2008 | Cok | H04N 7/144 348/333.01 |
| 2008/0123199 A1 | 5/2008 | Hong | |
| 2008/0198289 A1 | 8/2008 | Oohira | |
| 2008/0261057 A1 | 10/2008 | Slobodin | |
| 2008/0291356 A1 | 11/2008 | Kim | |
| 2008/0297487 A1 * | 12/2008 | Hotelling | G06F 1/3203 345/173 |
| 2009/0078937 A1 | 3/2009 | Saito | |
| 2009/0085848 A1 | 4/2009 | Huang | |
| 2009/0090694 A1 * | 4/2009 | Hotelling | G06F 3/044 216/41 |
| 2009/0091673 A1 | 4/2009 | Chen | |
| 2009/0091825 A1 | 4/2009 | Saito | |
| 2009/0153762 A1 | 6/2009 | Kuwabara | |
| 2009/0212300 A1 | 8/2009 | Komori | |
| 2009/0237576 A1 | 9/2009 | Nelson | |
| 2009/0237602 A1 | 9/2009 | Kubota | |
| 2009/0262277 A1 | 10/2009 | Kim | |
| 2009/0273550 A1 | 11/2009 | Vieri | |
| 2009/0280606 A1 | 11/2009 | Shih | |
| 2009/0316273 A1 | 12/2009 | Viens | |
| 2009/0322909 A1 * | 12/2009 | Garcia | G06T 15/04 348/239 |
| 2010/0001973 A1 | 1/2010 | Hotelling | |
| 2010/0002183 A1 | 1/2010 | Fukuda | |
| 2010/0020277 A1 | 1/2010 | Morita | |
| 2010/0026656 A1 | 2/2010 | Hotelling | |

(56) References Cited

U.S. PATENT DOCUMENTS

| | | |
|---|---|---|
| 2010/0033647 A1* | 2/2010 | Okita .................. H04N 5/2253 349/57 |
| 2010/0039530 A1 | 2/2010 | Guo |
| 2010/0077421 A1 | 3/2010 | Cohen |
| 2010/0097525 A1 | 4/2010 | Mino |
| 2010/0118231 A1 | 5/2010 | Kang |
| 2010/0144391 A1 | 6/2010 | Chang |
| 2010/0149743 A1 | 6/2010 | Shen |
| 2010/0167443 A1 | 7/2010 | Okada |
| 2010/0182273 A1 | 7/2010 | Noguchi |
| 2010/0182538 A1 | 7/2010 | Takata |
| 2010/0207857 A1 | 8/2010 | Gu |
| 2010/0273530 A1 | 10/2010 | Jarvis |
| 2010/0289994 A1 | 11/2010 | Nonaka |
| 2010/0302478 A1 | 12/2010 | Nakagawa |
| 2010/0309102 A1 | 12/2010 | Jung |
| 2010/0315570 A1 | 12/2010 | Mathew |
| 2010/0315769 A1 | 12/2010 | Mathew |
| 2010/0315868 A1 | 12/2010 | Tokunaga |
| 2010/0321325 A1 | 12/2010 | Springer |
| 2011/0001706 A1 | 1/2011 | Sanford |
| 2011/0005662 A1 | 1/2011 | Sung |
| 2011/0051360 A1 | 3/2011 | Dabov |
| 2011/0051411 A1 | 3/2011 | Kim |
| 2011/0063550 A1 | 3/2011 | Gettemy |
| 2011/0090444 A1 | 4/2011 | Kimura |
| 2011/0103041 A1 | 5/2011 | Mathew |
| 2011/0109829 A1 | 5/2011 | Mathew |
| 2011/0122308 A1 | 5/2011 | Duparre |
| 2011/0128220 A1 | 6/2011 | Bynum |
| 2011/0148780 A1 | 6/2011 | Lu |
| 2011/0149139 A1* | 6/2011 | Chang .................. H04N 5/2251 348/333.08 |
| 2011/0223969 A1 | 9/2011 | Chou |
| 2011/0235855 A1 | 9/2011 | Smith |
| 2011/0244656 A1 | 10/2011 | Dairiki |
| 2011/0248949 A1 | 10/2011 | Chang |
| 2011/0249093 A1 | 10/2011 | Yeh |
| 2011/0255000 A1* | 10/2011 | Weber .................. G03B 17/02 348/374 |
| 2011/0255018 A1 | 10/2011 | Roh |
| 2011/0273779 A1 | 11/2011 | Kathman |
| 2012/0014687 A1 | 1/2012 | Sanford |
| 2012/0020000 A1 | 1/2012 | Mathew |
| 2012/0020002 A1 | 1/2012 | Mathew |
| 2012/0020700 A1 | 1/2012 | Yamada |
| 2012/0038751 A1* | 2/2012 | Yuan .................. H04N 5/23232 348/51 |
| 2012/0050958 A1 | 3/2012 | Sanford |
| 2012/0050975 A1 | 3/2012 | Garelli |
| 2012/0075233 A1 | 3/2012 | Lakshminarayanan |
| 2012/0105400 A1 | 5/2012 | Mathew |
| 2012/0106063 A1 | 5/2012 | Mathew |
| 2012/0314162 A1 | 12/2012 | Ino |
| 2013/0027768 A1 | 1/2013 | Fahlbusch |
| 2013/0277533 A1 | 10/2013 | Olsen |

FOREIGN PATENT DOCUMENTS

| | | |
|---|---|---|
| JP | H09159813 | 6/1997 |
| JP | H10197662 A | 7/1998 |
| JP | 2000330090 A2 | 11/2000 |
| JP | 2001117077 | 4/2001 |
| JP | 3387136 | 1/2003 |
| JP | 2004081231 A | 3/2004 |
| JP | 2004135275 | 4/2004 |
| JP | 2005010407 A | 1/2005 |
| JP | 2005176151 | 6/2005 |
| JP | 2006119319 A | 5/2006 |
| JP | 2008009397 A | 1/2008 |
| JP | 2009015272 | 1/2009 |
| JP | 2010045463 A | 2/2010 |
| JP | 2010219948 A | 9/2010 |
| KR | 100400714 | 10/2003 |
| KR | 20040017693 | 2/2004 |
| KR | 100809277 | 3/2008 |
| KR | 1020080058911 | 6/2008 |
| KR | 100856092 | 9/2008 |
| KR | 1020080089908 | 10/2008 |
| WO | 2007096992 A1 | 8/2007 |
| WO | 2008120879 | 1/2008 |

OTHER PUBLICATIONS

European Search Report and Search Opinion for EP Application No. 11186785.9-1241 / 2448243, dated Aug. 14, 2012, 15 pages.

Examination Report received in GB Application No. 1118531.1, dated Aug. 6, 2013.

Extended European Search Report received in corresponding EP Application No. 13161036.2, dated May 31, 2013.

Extended European Search Report received in corresponding EP Application No. 13161142.8, dated May 31, 2013.

* cited by examiner

CAMERA LENS STRUCTURES AND DISPLAY STRUCTURES FOR ELECTRONIC DEVICES

BACKGROUND

This invention relates to electronic devices and, more particularly, to camera structures such as camera lens structures and associated display structures for electronic devices.

Electronic devices such as portable computers and cellular telephones often have cameras. Cameras may be used to take still images and may be used to support video features such as video calls.

In a cellular telephone with a camera, the camera may be mounted under a portion of a cover glass layer in the display of the cellular telephone. Black ink may be printed under the cover glass to hide the camera from view. An opening may be formed in the black ink to form a window for the camera.

In a portable computer, a camera may be mounted along the upper edge of the display. In a typical arrangement, the display may be mounted within the housing of the portable computer using a bezel. An opening may be provided in the bezel to form a window for the camera.

Camera mounting arrangements such as these may not be satisfactory in device configurations where space is at a premium. For example, it may not be acceptable to include a cover glass layer in a cellular telephone or it may not be desirable to include a bezel in a portable computer. Without the presence of conventional display structures such as these, it can be challenging to mount electronic components such as cameras within a device.

It would therefore be desirable to be able to provide improved camera and display structures for electronic devices.

SUMMARY

An electronic device may be provided with a display. The display may contain display layers such as polarizer layers, a color filter layer, and a thin-film transistor layer. Cover glass may optionally be omitted from the display.

A camera may be mounted under a camera window in the display. The camera window may be formed by forming one or more openings in the layers of the display. For example, openings may be formed in a polarizer layer, in a color filter layer, and in a thin-film transistor layer.

The camera may contain lens structures formed from multiple lens elements. Some of the lens structures may be formed above part of the display and some of the lens structures may be formed below part of the display. For example, a first part of the lens structures may be located above one or more display layers and a second part of the lens structures may be located below these display layers. The display layers that are interposed within the lens structures in this way may include the color filter layer, the thin-film transistor layer, and the polarizer layer.

A layer of material such as a glass insert layer may be attached to the color filter layer and the thin-film transistor layer. The glass insert may have an opening that serves as a window for the camera. The color filter layer and the thin-film transistor layer may have edges that are aligned. In the vicinity of the glass insert, the edge of the color filter layer may be recessed relative to the edge of the thin-film transistor layer to form a ledge upon which the glass insert may be mounted using adhesive.

A sleeve structure may be mounted within the openings in the display layer and the glass insert. A clear layer of material may be inserted within the sleeve structure to serve as a window. The lens structures may include lens elements that are mounted within the sleeve.

An opaque masking layer may be mounted on the lower surface of a polarizer layer or other display layer. An opaque masking layer opening within the opaque masking layer may be aligned with the lens structures within the camera and intervening layers of the display.

Further features of the invention, its nature and various advantages will be more apparent from the accompanying drawings and the following detailed description of the preferred embodiments.

DETAILED DESCRIPTION

Electronic devices such as notebook computers, tablet computers, cellular telephones, and other computing equipment may be provided with displays. Cameras and other electronic components may be mounted within the electronic devices in the vicinity of the displays. Mounting arrangements may be used in which a portion of the lens in the camera is mounted above one or more layers of the display and a portion of the lens in the camera is mounted below one or more layers of the display. In some configurations, the camera lens may protrude through one or more layers of the display and associated insert layers.

Figure 1:
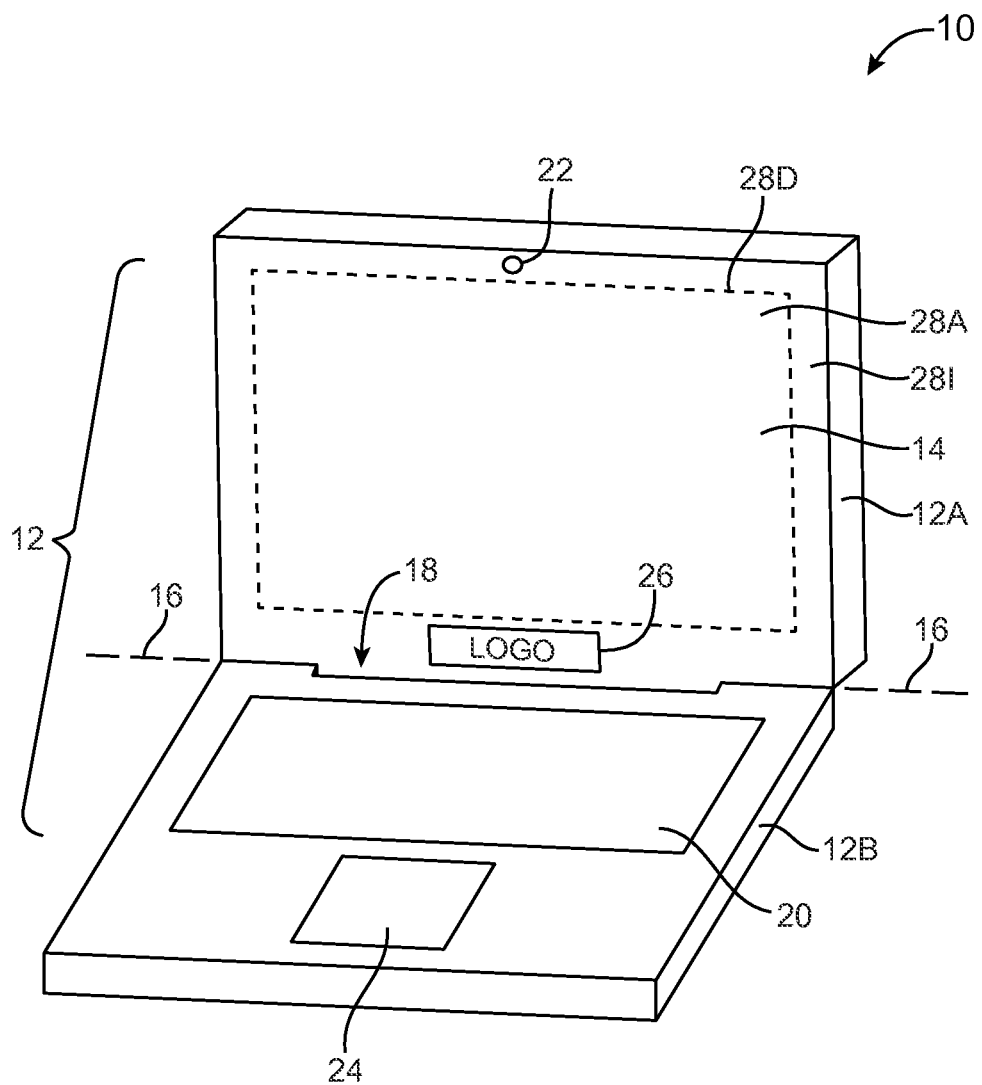
FIG. 1 is a perspective view of an illustrative portable computer with display structures in accordance with an embodiment of the present invention.

An illustrative electronic device such as a portable computer or other electronic equipment that has a display is shown in FIG. 1. As shown in FIG. 1, display 14 of device 10 may be mounted in upper housing portion 12A of housing 12. Housing 12 may be formed from a unibody construction in which some or all of housing 12 is formed form a unitary piece of material (e.g., metal, plastic, or fiber composite materials) or may be formed from multiple structures that have been mounted together using adhesive, fasteners, and other attachment mechanisms. For example, housing 12 may be formed from frame members and other internal supports to which external plates, housing sidewalls, bezel structures, and other structures are mounted.

Because housing portion 12A may be used to house display 14, housing portion 12A may sometimes be referred to as a display housing. Display housing 12A may be attached to housing portion 12B (sometimes referred to as a main unit or base housing) using hinge structures 18, so that display housing 12A may rotate relative to main housing 12B around hinge axis 16. Device 10 may include ports for removable media, data ports, keys such as keyboard 20, input devices such as track pad 24, microphones, speakers, sensors, status indicators lights, etc.

Display 14 may have an active portion and an inactive portion. Active portion 28A of display 14 may have a shape such as the rectangular shape that is bounded by dashed line 28D in FIG. 1. Inactive portion 28I of display 14 may have a rectangular ring shape or other suitable shape and may form a border around the periphery of display 14. Image pixel array elements such as liquid crystal diode image pixels or other active image pixel structures may be used in portion 28A to present images to a user of device 10. Inactive portion 28I is generally devoid of image pixel elements and does not participate in forming images for a user. To hide unsightly internal components from view, internal components in inactive portion 28I may be blocked from view using an opaque masking layer such as a layer of ink.

Device 10 may have components that are formed in inactive device region 28I. For example, device 10 may have a camera such as camera 22. Camera 22 may be mounted within display housing 12A and may operate through a window (sometimes referred to as a camera window) in display 14.

Additional structures such as logo structures 26 may also be mounted in upper housing 12A. For example, logo 26 may be formed in inactive display region 28I of upper housing 12A under a transparent window in display 14.

Figure 2:
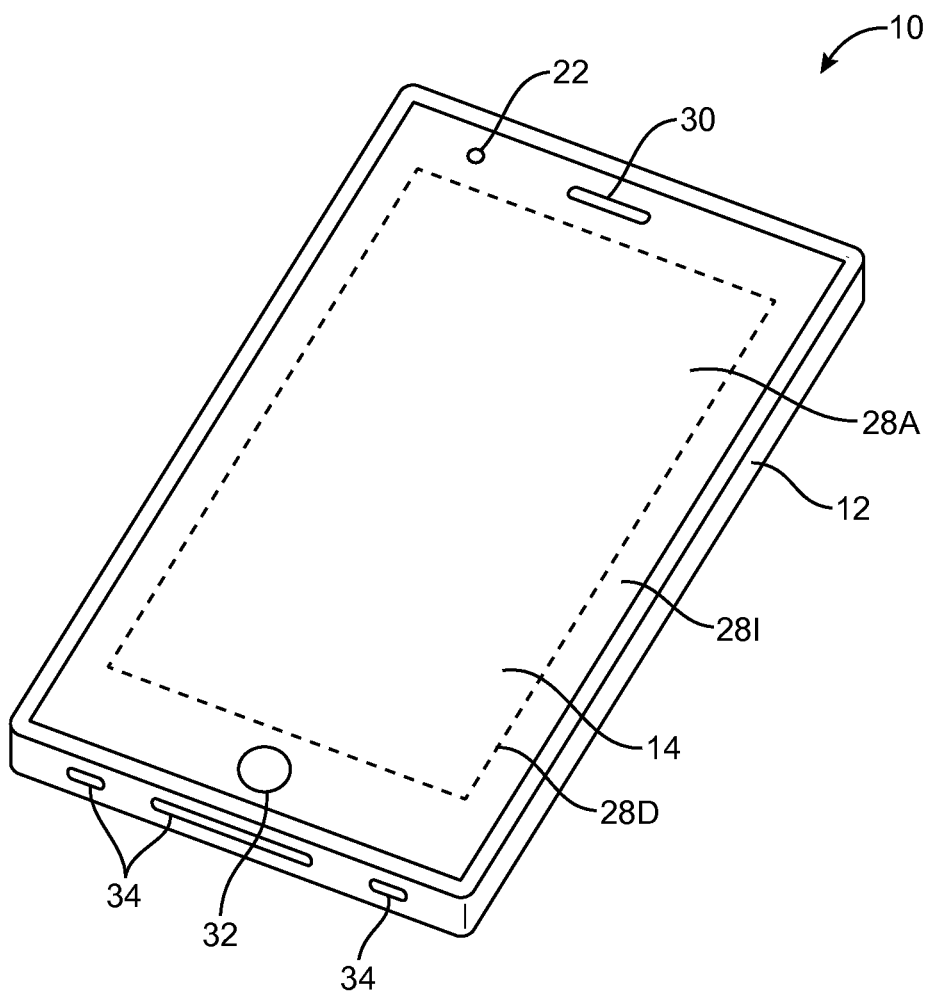
FIG. 2 is a perspective view of a handheld device in accordance with an embodiment of the present invention.

FIG. 2 is a perspective view of an illustrative configuration that may be used for a handheld electronic device. Electronic device 10 of FIG. 2 may be, for example, a cellular telephone or other handheld electronic equipment. Device 10 of FIG. 1 may have housing 12. Display 14 may be mounted within housing 12 on the front of device 10. Active portion 28A of display 14 may lie within rectangular boundary 28D. Inactive portion 28I of display 14 may form a boundary around the periphery of display 14. Housing 12 may have sidewalls that run around the periphery of device 10 (as an example). The sidewall structures of housing 12 may be formed from metal, plastic, glass, ceramic, carbon-fiber materials or other fiber-based composites, other materials, or combinations of these materials. The rear of housing 12 may be formed from metal, plastic, a planar member such as a glass or ceramic plate, fiber-based composites, other materials, or combinations of these materials.

Device 10 may have openings such as openings 34 in the sidewalls of housing 12. Openings 34 may be used to form microphone and speaker ports, openings to accommodate button members, openings for data ports and audio jacks, etc. One or more openings may be formed in inactive region 28I of display 14. For example, one or more openings may be formed in inactive region 28I for buttons such as button 32 (e.g., a menu button). Openings such as opening 30 may also be formed in inactive region 28I (e.g., to form a speaker port for an ear speaker).

Camera 22 may be covered by a window structure. If desired, windows may also be formed over information such as logo information (see, e.g., information structures 26 of FIG. 1) to allow the logo or other information to be viewed by a user of device 10.

The illustrative electronic device structures of FIGS. 1 and 2 are merely examples. Any suitable electronic devices 10 may be provided with displays 14. Electronic devices 10 may, for example, include tablet computers, wristwatch devices, pendant devices, other miniature and wearable devices, televisions, computer displays, accessories, etc.

Figure 3:
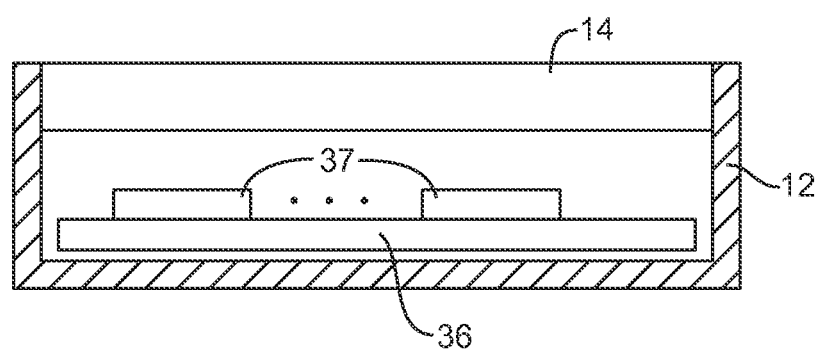
FIG. 3 is a cross-sectional side view of an electronic device having a display in accordance with an embodiment of the present invention.

A cross-sectional end view of an electronic device with a display (e.g., a device such as device 10 of FIG. 2, a portion of device 10 of FIG. 1, etc.) is shown in FIG. 3. As shown in FIG. 3, display 14 may be mounted within housing 12 so that the exterior surface of display 14 is exposed. Device housing 12 may be used to enclose printed circuit boards such as printed circuit board 36. Printed circuit board 36 may be a rigid printed circuit board such as a fiberglass-filled epoxy printed circuit board (e.g., FR4), a flexible printed circuit ("flex circuit") formed from a flexible dielectric such as a sheet of polyimide with patterned conductive traces, a rigid flex substrate, or other substrate.

Electrical components such as components 37 may be mounted to boards such as board 36. Electrical components 37 may include switches, resistors, inductors, capacitors, integrated circuits, connectors, cameras, sensors, speakers, or other device components. These components may be soldered or otherwise connected to board 36.

Display 14 may be a touch screen display. Touch screen displays such as display 14 of FIG. 3 may include an array of capacitive electrodes (e.g., transparent electrodes such as indium tin oxide electrodes), or may include a touch sensor array based on other touch technologies (e.g., resistive touch sensor structures, acoustic touch sensor structures, piezoelectric sensors and other force sensor structures, etc.) The touch structures for display 14 may be implemented on a dedicated touch sensor substrate such as a layer of glass or may be formed on the same layer of glass that is being used for other display functions. For example, touch sensor electrodes may be formed on a color filter array layer, a thin-film transistor layer, or other layers in a liquid crystal display (LCD).

Display 14 may, in general, be formed from any suitable type of display structures. Examples of display structures that may be used for display 14 include liquid crystal display (LCD) structures, organic light-emitting diode (OLED) structures, plasma cells, and electronic ink display structures. Arrangements in which display 14 is formed from liquid crystal display (LCD) structures are sometimes described herein as an example. This is merely illustrative. In general, display 14 may be formed using any suitable display technology.

Figure 4:
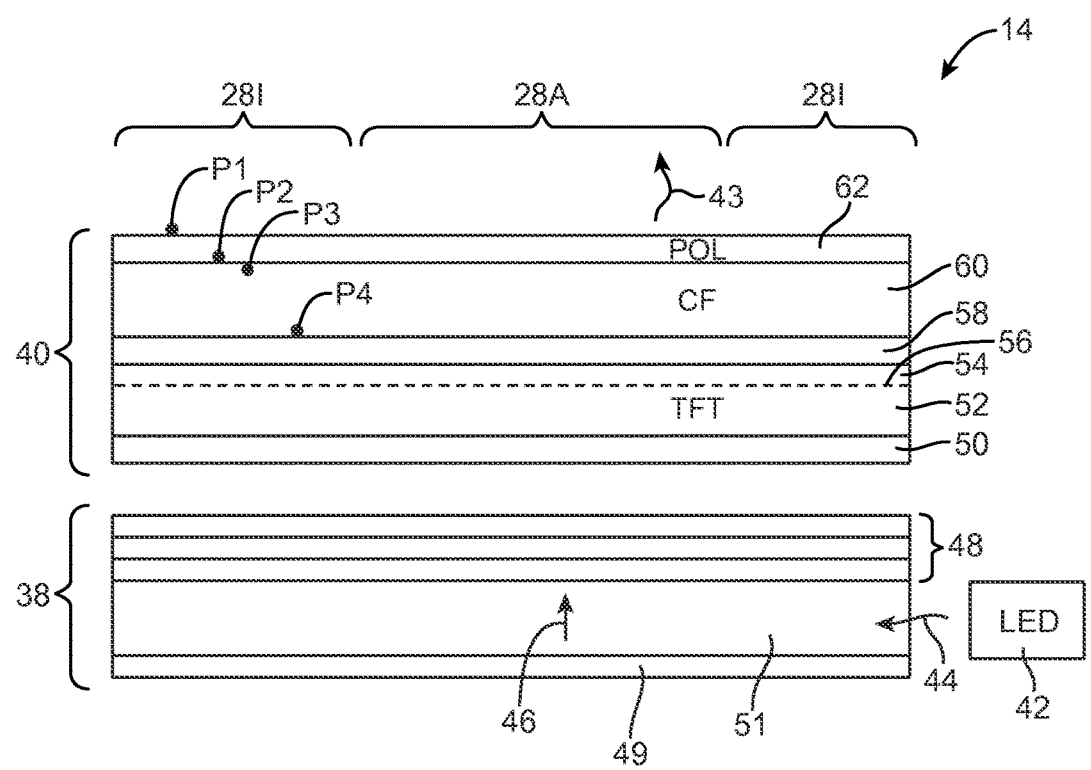
FIG. 4 is a cross-sectional side view of illustrative display structures in accordance with an embodiment of the present invention.

A cross-sectional view of display 14 of FIG. 2 is shown in FIG. 4. As shown in FIG. 4, display 14 may include a backlight unit (BLU) such as backlight unit 38. Light 44 for backlight unit 38 may be launched into light-guide panel 51 from light source 42. Light source 42 may be formed from an array of light-emitting diodes (as an example). Reflector 49 (e.g., white polyester) may be used to reflect light 44 upwards (outwards) in direction 46 through display module 40. Optical films 48 may include a diffuser layer and light collimating layers (as an example).

Display 14 and display module 40 may have an active region 28A that produces image pixel light 43 from an array of image pixels. Image pixel light 43 forms an image in active region 28A that may be viewed by a user of device 10. The image may include text, graphics, or other image information. A portion of display 14 and display module 40 such as region 28I may be inactive. Region 28I may have a shape that surrounds the periphery of display 14 and display module 40 as shown in FIG. 1 (as an example). Inactive region 28I generally does not contain active image pixels and may include an opaque masking layer to block interior structures from view. Backlight unit 38 may have a footprint that is aligned with active region 28A or may have edges that extend under some or all of inactive region 28I (as shown in FIG. 4).

Display module 40 may include a lower polarizer such as lower polarizer 50 and an upper polarizer such as polarizer 62. A thin layer (e.g., 3-5 microns) of liquid crystal material 58 may be interposed between color filter layer 60 and thin-film transistor layer 52.

Thin-film transistor layer 52 may be formed on a transparent planar substrate such as a layer of glass or plastic. The upper surface of thin-film-transistor layer 52 may contain pixel electrode structures and thin-film transistors (shown as circuitry 54 above dashed line 56). The circuitry on thin-film-transistor layer 52 may be organized into an array of image pixels that can be controlled to display images on display 14 for a user of device 10.

Color filter layer 60 may include colored filter pixel elements (e.g., red, green, and blue filter elements) that provide display 14 with the ability to display color images. Color filter layer 60 may be formed using a transparent planar substrate such as a glass or plastic substrate.

If desired, other layers of material may be included within display module 40 and backlight unit 38. For example, display module 40 and backlight unit 38 may include one or more layers of material for forming a touch sensor, layers of optical films such as birefringent compensating films, anti-reflection coatings, scratch prevention coatings, oleophobic coatings, layers of adhesive, etc.

Patterned opaque masking layers may be included in display module 40 to block internal structures from view by a user. An opaque masking layer may be formed from black ink, ink with other (non-black) colors (e.g., white, silver, gray, red, blue), an opaque polymer, a layer of metal, or other suitable opaque substances. Examples of locations in which an opaque masking layer may be formed in display module 40 include position P1 on the top of polarizer 62, position P2 on the lower surface of polarizer 62, position P3 on the top surface of color filter layer 60, and position P4 on the lower surface of color filter layer 60. Other masking layer locations and combinations of masking layer locations may be used if desired.

Figure 5:
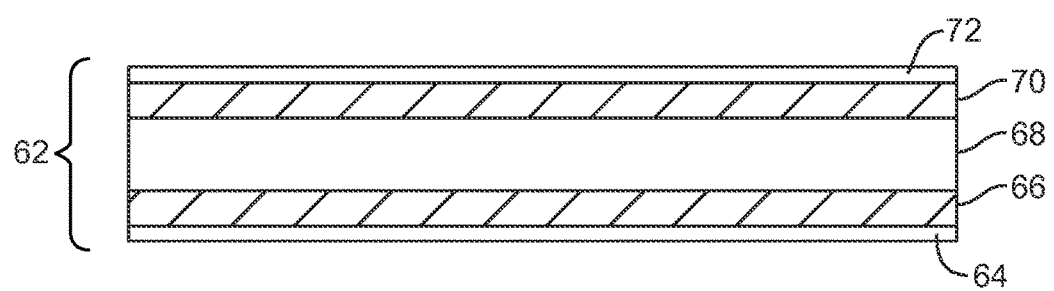
FIG. 5 is a cross-sectional side view of a polarizer for an electronic device display in accordance with an embodiment of the present invention.

Polarizers such as upper (outer) polarizer 62 and lower (inner) polarizer 50 may be formed from multiple layers of material that are laminated together. An illustrative laminated polarizer is shown in the cross-sectional side view of FIG. 5. As shown in FIG. 5, polarizer 62 (i.e., an upper polarizer in this example) may have polarizer film 68. Film 68 may be formed from a stretched polymer such as stretched polyvinyl alcohol (PVA) and may therefore sometimes be referred to as a PVA layer. Iodine may be placed on to the stretched PVA film so that iodine molecules align with the stretched film and form the polarizer. Other polarizer films may be used if desired. Polarizer film 68 may be sandwiched between layers 66 and 70. Layers 66 and 70 may be formed from a material such as tri-acetyl cellulose (TAC) and may sometimes be referred to as TAC films. The TAC films may help hold the PVA film in its stretched configuration and may protect the PVA film. Other films may be laminated to film 68 if desired.

Coating layer 72 may be formed from one or more films of material that provide polarizer 62 with desired surface properties. For example, layer 72 may be formed from materials that provide polarizer 62 with antiglare (light diffusing) properties, antireflection properties, scratch resistance, fingerprint resistance, and other desired properties. Layer 72 may be formed from one or more layers of material such as antireflection (AR) layers (e.g., films formed from a stack of alternating high-index-of-refraction and low-index-of-refraction layers), antiglare (AG) layers, antireflection-antiglare (AR/AG) layers, oleophobic layers, antiscratch coatings, or other coating layers. The functions of these layers need not be mutually exclusive. For example, an antiglare film in coating 72 may help provide polarizer 62 with scratch resistance.

Polarizer 62 may, if desired, be provided with a layer of adhesive such as adhesive 64 (e.g., optically clear adhesive) to help attach polarizer 62 to the upper surface of display module 40 (i.e., color filter 60 of FIG. 4). The thickness of polarizer 62 may be about 50-200 microns (as an example).

Figure 6:
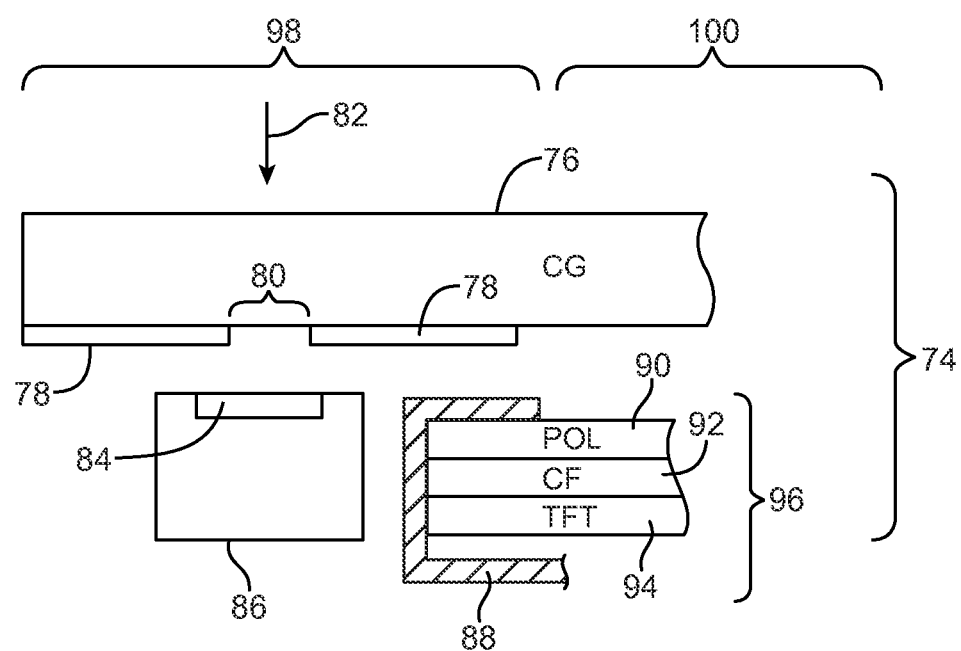
FIG. 6 is a cross-sectional side view of a conventional liquid crystal display (LCD) module and camera in a portable computer.

It is often desirable to mount cameras within the interior of an electronic device. Conventionally, a camera may be mounted under a layer of cover glass in the inactive portion of a display. This type of arrangement is shown in FIG. 6. As shown in FIG. 6, conventional device structures 74 may include cover glass 76. Cover glass 76 may be associated with a display that has active and inactive regions. For example, cover glass 76 of FIG. 6 may be associated with inactive display region 98 and active display region 100.

Black ink layer 78 is formed on the underside of cover glass 76 in inactive region 98 and blocks internal components such as camera 86 from view. Black ink layer 78 has opening 80 for camera 86. During operation, light 82 from an image can pass through layer 76 and opening 80 into lens 84 of camera 86. Display module 96 is mounted under active region 100. Display module 96 includes color filter layer 92, thin-film transistor layer 94, upper polarizer 90, and other LCD layers mounted within chassis structure 88. Black ink 78 hides chassis structure 88 from view.

Figure 7:
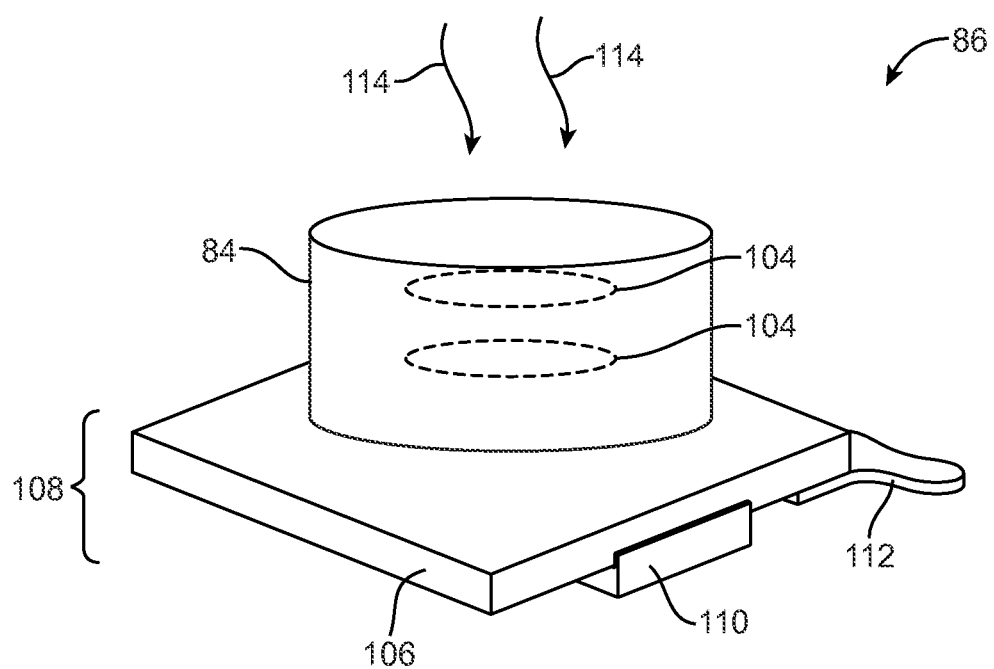
FIG. 7 is a perspective view of a conventional camera of the type shown in FIG. 6.

FIG. 7 is a perspective view of conventional camera 86. Camera 86 may gather image light 114 using lens 84. Image light is focused by lens 84 onto solid state image sensor 110. Image sensor 110 is mounted to printed circuit board 106, which forms part of camera base 108. Signals may be routed to and from base 108 using flexible printed circuit ("flex circuit") 112. Flex circuit 112 is connected to traces in printed circuit board 106. These traces interconnect the conductive lines in flex circuit 112 to the image pixels in sensor 110. Lens 84 is formed from a stack of lens elements 104 and is sometimes referred to as a lens train. In a conventional mounting arrangement of the type shown in FIG. 6, all lens elements 104 in lens train 84 are mounted in a stack that is located below ink opening 80 on the underside of cover glass layer 76.

Figure 8:
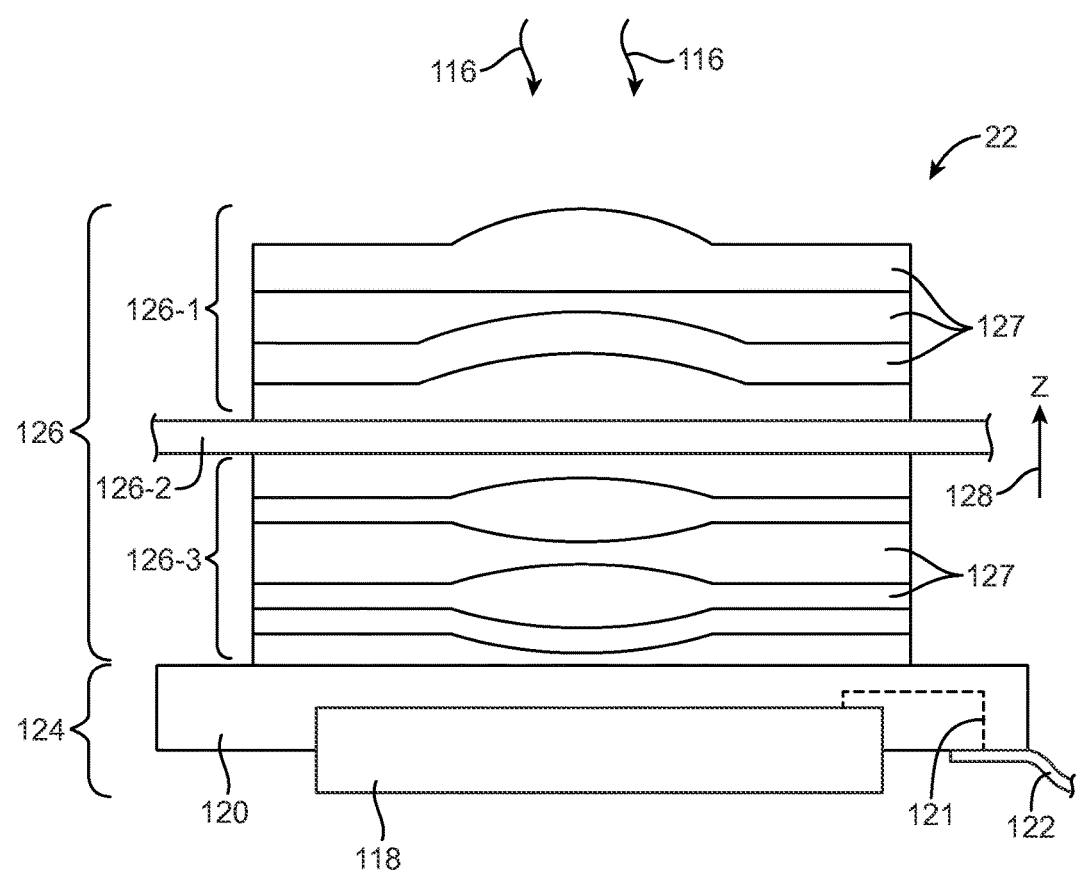
FIG. 8 is a cross-sectional side view of an illustrative camera with lens structures that may be used in an electronic device in accordance with an embodiment of the present invention.

A camera of the type that may be used in electronic device 10 is shown in FIG. 8. As shown in FIG. 8, camera 22 may include a lens such as lens 126 (sometimes referred to as a lens train or lens structures). Lens structures 126 may be used to focus image light 116 onto image sensor 118. Image sensor 118 may include an array of image sensor pixels. Image sensor 118 may be mounted to a substrate such as printed circuit board 120. Printed circuit board 120 may include interconnects 121 that route signals between image sensor array 118 and cable 122. Cable 122 may be formed from a flex circuit (e.g., a flexible printed circuit in which conductive traces are formed on one or more flexible substrate layers such as layers of polyimide or other polymer sheets). One end of cable 122 (i.e., the end of cable 122 that is shown in FIG. 8) may be connected to printed circuit board 120 using a connector, using solder, using conductive adhesive, etc. An opposing end of cable 122 may be connected to traces on a printed circuit board such as a main logic board in device 10 (e.g., using a connector, using solder connections, using conductive adhesive connections, etc.).

Lens structures 126 may include one or more layers 127 of transparent material. These layers of material may serve as optical elements within the imaging path of lens 22 and are therefore sometimes referred to as lens elements. Examples of materials that may be used to form the layers (lens elements) in lens structures 126 include glass, plastic (e.g., plastic sheets and polymeric adhesives), ceramic, transparent conductive materials such as indium tin oxide, other clear materials, or combinations of these materials.

The layers of lens structures 126 may have concave surfaces, convex surfaces, flat surfaces, and surface shapes that form lens elements with combinations of these surfaces (e.g., lens elements with flat and convex surfaces, lens elements with convex and concave surfaces, lens elements with flat and concave surfaces, etc.). The index of refraction of each layer may potentially be different. If desired, layers of adjacent material may have matched indices of refraction. Lens structures 126 may also include stacks of high-index-of-refraction and low-index-of-refraction materials. Layers of material may, for example, have alternating high and low indices of refraction or other patterns. Using these patterns of material in the layers that make up lens structures 126, lens structures 126 may be provided with desired optical properties. For example, the layers of lens structures 126 may be used implement an antireflection coating, a reflective coating, a bandpass filter, a cut-off filter such as an ultraviolet light cutoff filter or an infrared light cutoff filter, etc. The size and shape of the lens elements in lens structures 126 may be selected to implement a lens with a desired focal length and aperture for camera 22.

If desired, lens structure 126 may be mounted below one or more layers of transparent material in device 10 (e.g., one or more layers associated with display 14 such as a cover glass layer, a polarizer layer, a color filter layer, a thin-film transistor layer, other optical films, etc.). In some illustrative arrangements, one or more layers of display 14 may be interposed as intermediate layers within lens structures 126.

As shown in FIG. 8, for example, lens structure 126 may include one or more intermediate layers such as layer 126-2 that are sandwiched between other portions of lens structure 126. Layer 126-2, which may be a display layer such as a cover glass layer, a polarizer layer, a color filter layer, a thin-film transistor layer, other layer, may be sandwiched between upper (outer) lens structures 126-1 and lower (inner) lens structures 126-3. Structures such as structures 126-1 and 126-3 may, for example, each include a stack of lens elements and may therefore be said to form lens train portions for lens structures 126 (e.g., an upper lens train portion and a lower lens train portion, respectively).

Taken together, lens structures 126-1, 126-2, and 126-3 may be configured to serve as the lens for camera 22 by focusing image light 116 onto image sensor 118. In configurations in which one or more display layers such as illustrative layer 126-2 of FIG. 8 are located at intermediate positions within the lens train for camera 22, it may be possible to minimize the height (Z-dimension parallel to Z-axis 128 of FIG. 8) of the portion of lens structures 126 beneath display 14 (e.g., structures 126-3 of FIG. 8). This may help minimize the size of camera 22 and device 10. The size of the optical structures associated with camera 22 and device 10 may also be minimized (if desired) by omitting cover glass 76 of FIG. 6 from device 10, as described in connection with display 14 of FIG. 4.

Figure 9:
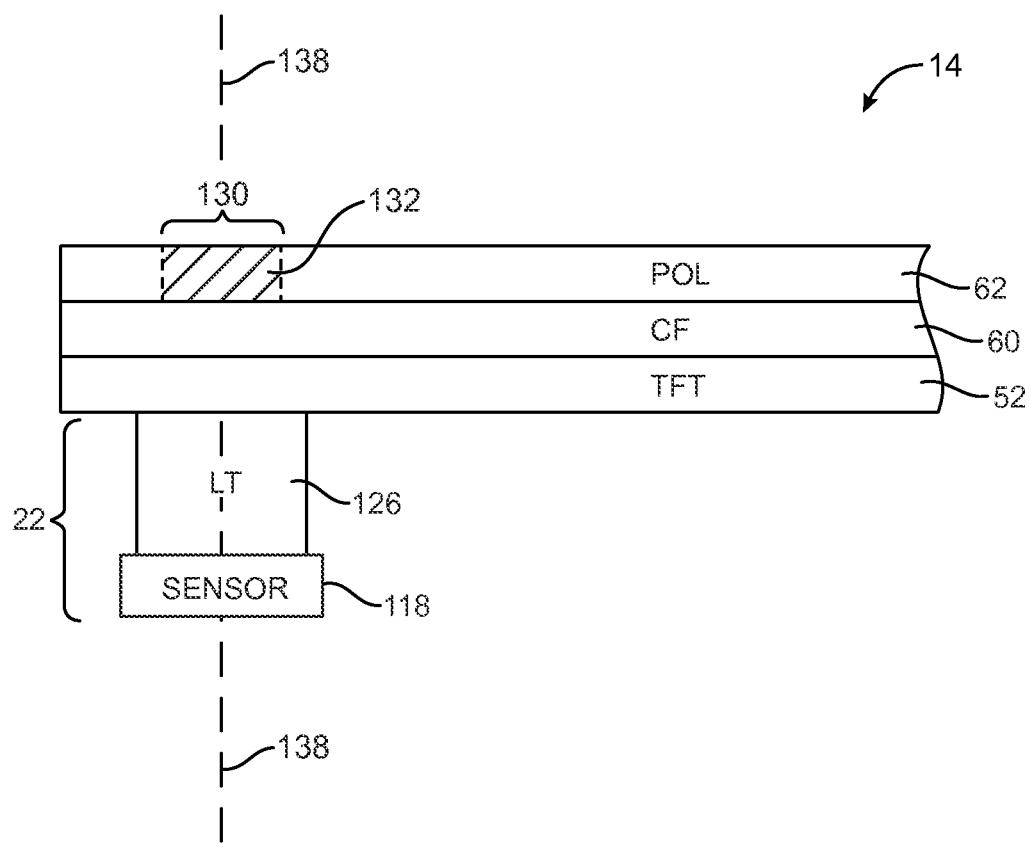
FIG. 9 is a cross-sectional side view of a portion of a display showing how a camera may be mounted below layers of the display such as a polarizer layer, color filter layer, and thin-film-transistor layer in accordance with an embodiment of the present invention.

In configurations of device 10 such as those in which cover glass 76 is omitted, it may be desirable to form a transparent unpolarized window within polarizer layer 62. As shown in FIG. 9, for example, it may be desirable to depolarize material 132 to form transparent unpolarized window 130 within polarizer 62. Window 130 may be used to allow internal structures within device 10 to be viewed from the exterior of device 10 and/or to permit sensors and other electronic components such as camera 22 that are mounted within the interior of device 10 to receive light from the exterior of device 10. Unpolarized window regions such as window 130 in polarizer 62 are sometimes referred to herein as camera windows.

Camera window 130 may be formed by applying ultraviolet light to polarizer 62 where it is desired to form window 130 (e.g., to bleach the iodine-coated polyvinyl alcohol layer in polarizer 62 such as layer 68 of FIG. 5). Light for locally bleaching polarizer 62 and thereby forming camera window 130 may be applied using a mask, using a lens, or using other suitable techniques. If desired, camera window 130 may be formed by chemically bleaching polarizer 62 or by otherwise locally modifying the optical properties of polarizer 62. Removing the polarizing properties of polarizer 62 within window 130 may improve light transmission and may improve image quality. Windows such as window 130 may also be formed by selectively removing a portion of polarizer 62.

As shown in FIG. 9, camera 22 may be aligned with window 130 along vertical alignment axis 138 (i.e., so that window 130 and camera 22 are coaxial). If desired, a layer of opaque ink or other opaque masking layer may be included in display. The opaque masking layer may have an opening that is aligned with axis 138.

In the illustrative mounting configuration of FIG. 9, camera 22 has been mounted so that lens structures 22 are formed below polarizer 62, color filter layer 60, and thin-film-transistor layer 52. The portions of color filter layer 60 and thin-film transistor layer 52 that are interposed between camera 22 and window 130 may be transparent. For example, the portions of color filter layer 60 that are aligned with camera 22 may be devoid of colored filter elements and the portions of thin-film-transistor layer 52 that are aligned with camera 22 may be devoid of thin-film transistors, electrodes, and other potentially light-blocking structures.

Figure 10:
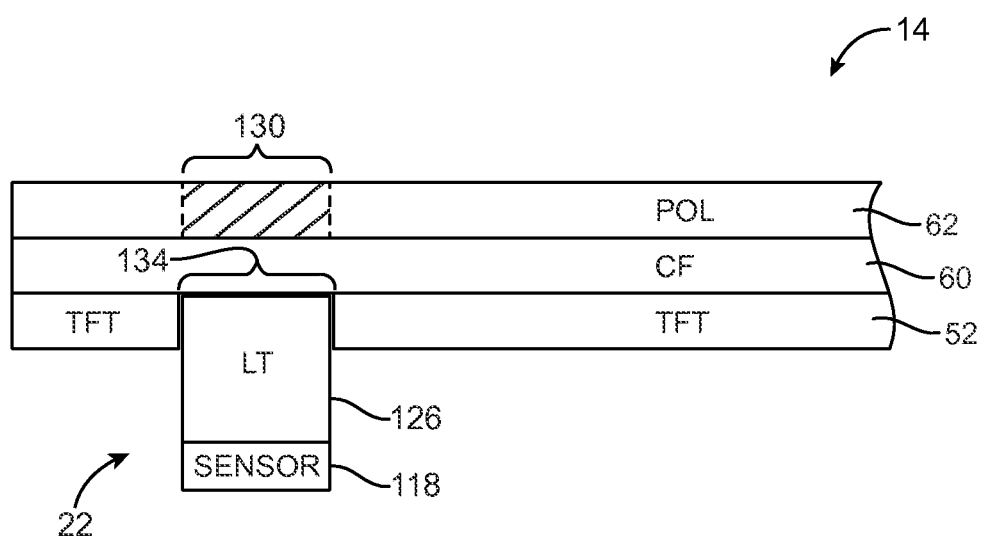
FIG. 10 is a cross-sectional side view of a portion of a display showing how a camera may be mounted below layers of the display such as a polarizer layer and color filter layer while a lens in the camera passes through an opening in a thin-film-transistor layer in accordance with an embodiment of the present invention.

If desired, an opening may be formed partway or completely through thin-film-transistor layer 52 to accommodate lens structures 126. This type of configuration is shown in FIG. 10. As shown in FIG. 10, thin-film-transistor layer 52 may include an opening such as opening 134 into which some or all of lens structures 126 may be mounted. Lens structures 126 may be formed by depositing, molding, or otherwise forming structures 126 within display layer openings such as opening 134 or may be formed into completely or partly finished stacks of lens elements before insertion into openings such as opening 134. Adhesive, fasteners, and other structures and materials may be used to mount lens structures 126 within display layer openings such as opening 134 in thin-film-transistor layer 52.

Figure 11:
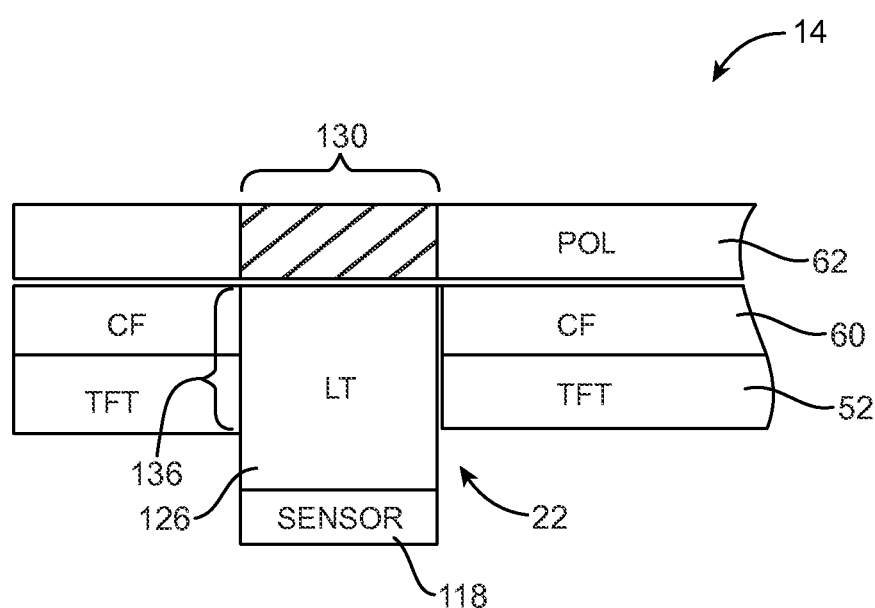
FIG. 11 is a cross-sectional side view of a portion of a display showing how a camera lens may be mounted below a polarizer layer in a display while passing through openings in a color filter layer and thin-film-transistor layer in accordance with an embodiment of the present invention.

In the example of FIG. 10, the portion of color filter layer 60 that is aligned with camera 22 is solid and does not contain an opening. As shown in FIG. 11, color filter layer 60 may, if desired, include an opening that partly or completely passes through color filter layer 60 to accommodate lens structures 126. In the FIG. 11 example, opening 136 passes completely through thin-film-transistor layer 52 and color filter layer 60, so that lens structures 126 are mounted against the lower surface of polarizer 62 under window 130.

Figure 12:
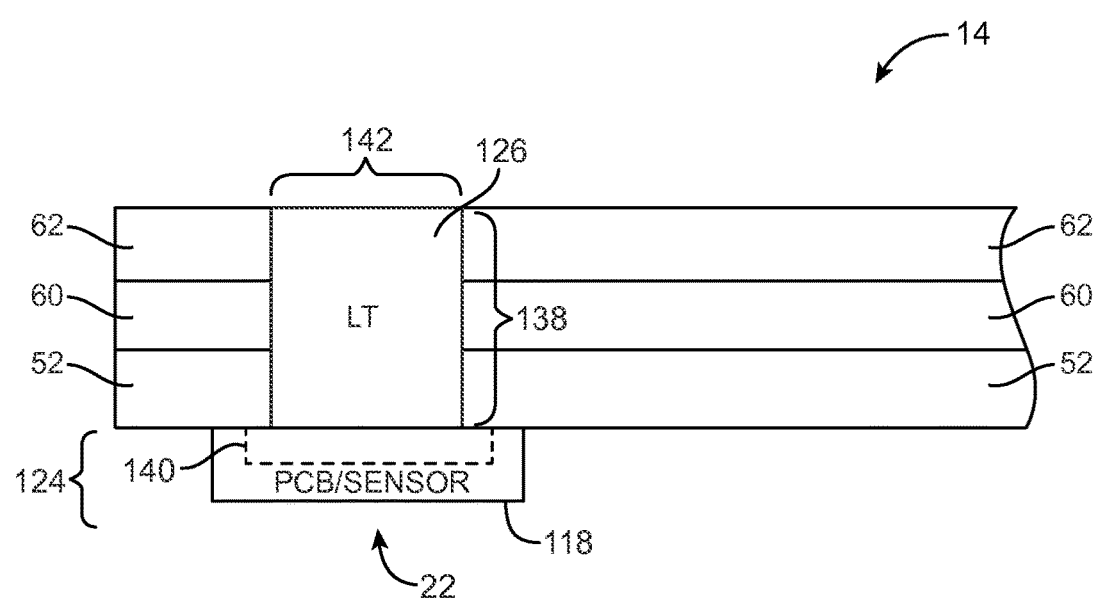
FIG. 12 is a cross-sectional side view of a portion of a display showing how a camera lens may pass through openings in a polarizer layer, color filter layer, and thin-film-transistor layer in accordance with an embodiment of the present invention.

FIG. 12 is a cross-sectional side view of an illustrative configuration in which opening 138 extends through polarizer 62, color filter layer 60, and thin-film-transistor layer 52. In this type of configuration, opening 142 in polarizer 62 may form a camera window for camera 22. As illustrated by dashed line 140, some of lens structures 126 may, if desired, be accommodated within printed circuit board 118 or other structures in base 124 of camera 22. If desired, a coating layer may be provided over display structures of the type shown in FIG. 12 (e.g., an antireflection coating or other layer associated with the outermost surface of polarizer 62, a cover glass layer or other layer to protect polarizer 62 and the other layers of display 14, etc.). The coating layer may be used to cover structures 126 in window region 142 and/or the outer surface of polarizer 62 (as an example).

Openings such as opening 134 of FIG. 10, 136 of FIG. 11, and 138 of FIG. 12 may be circular in shape, rectangular in shape, or may have other suitable shapes. The portions of the layers that form display 14 in the vicinity of these openings may completely surround the openings (as shown by the laterally enclosed openings in FIGS. 10, 11, and 12).

Figure 13:
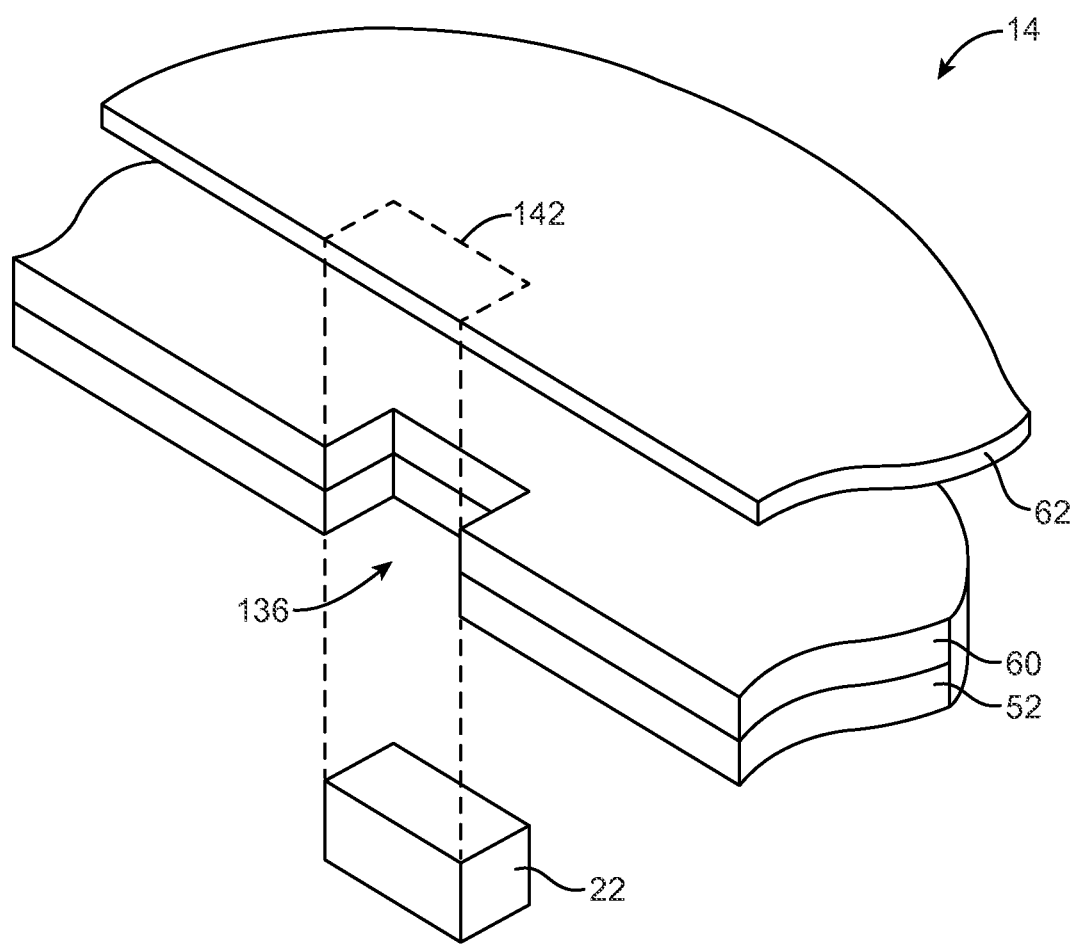
FIG. 13 is a perspective view of a portion of a display having a notch to accommodate a camera in accordance with an embodiment of the present invention.

If desired, openings such as openings 134, 136, and 138 may be formed along the edge of display 14. An example of this type of notched-shaped opening arrangement is shown in FIG. 13. As shown in FIG. 13, opening 136 may be formed in display layers such as thin-film-transistor layer 52 and color filter layer 60. Because one of the sides of opening 136 is located along the edge of display 14, opening 136 is not completely surrounded by the display layers, but rather has an open edge portion.

Opening 136 of FIG. 13 may be used to accommodate camera 22. For example, lens structures 126 (see, e.g., FIG. 11) may be mounted within opening 136 of FIG. 13 so that the uppermost portions of lens structures 126 rest against the inner surface of polarizer layer 62. As indicated by dashed line 142, a notch-shaped opening may be formed in polarizer 62 such as opening 142 of FIG. 12. If desired, color filter layer 60 may be solid and may contain no camera opening (e.g., the edge-aligned opening that accommodates camera 22 of FIG. 13 may extend only through thin-film-transistor layer 52, as indicated by opening 134 of FIG. 10).

Figure 14:
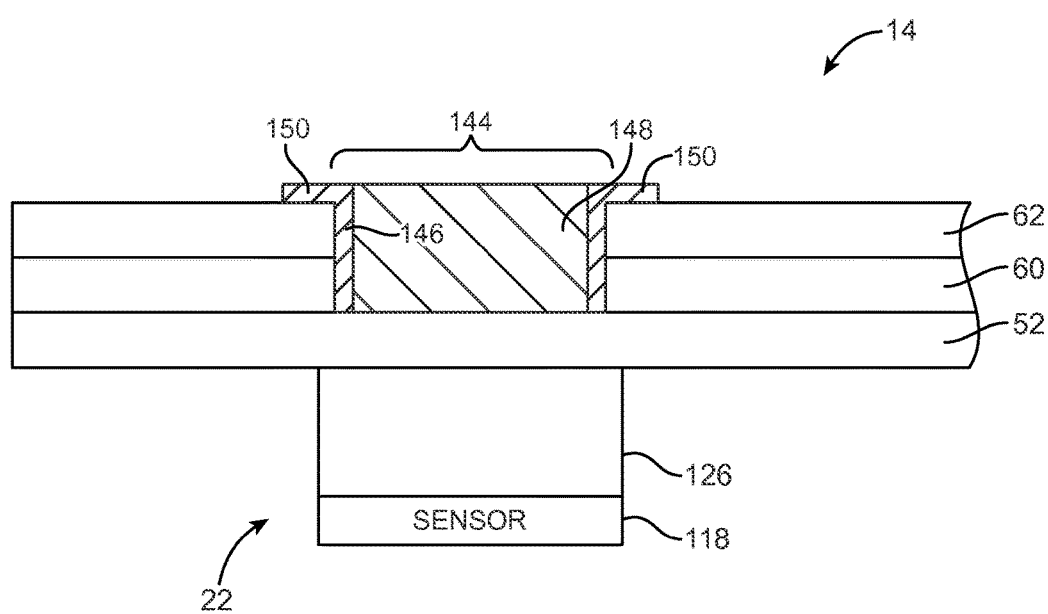
FIG. 14 is a cross-sectional side view of portions of a display in an electronic device showing how a window opening that is lined with a sleeve may be formed through a polarizer layer and color filter layer to accommodate a camera that is mounted under a thin-film-transistor layer in accordance with an embodiment of the present invention.

It may be desirable to line the interior of the openings in the layers of display 14 with a liner structure such as a cylindrical sleeve. This type of configuration is shown in the illustrative cross-sectional side view of display 14 in FIG. 14. As shown in FIG. 14, opening 144 may be lined with a sleeve structure such as sleeve 146. Opening 144 may pass through polarizer 66, some or all of color filter 60, and some or all of thin-film-transistor layer 52. Adhesive may be used to help secure sleeve 146 within opening 144. To ensure that opening 144 is sufficiently deep to retain sleeve 146, opening 144 may be formed through both polarizer 62 and color filter layer 60 (as an example). In general, opening 144 may pass through only layer 62, through layer 62 and some or all of layer 60, through layer 62, layer 60, and some or all of layer 52, or may pass through additional layers.

Figure 15:
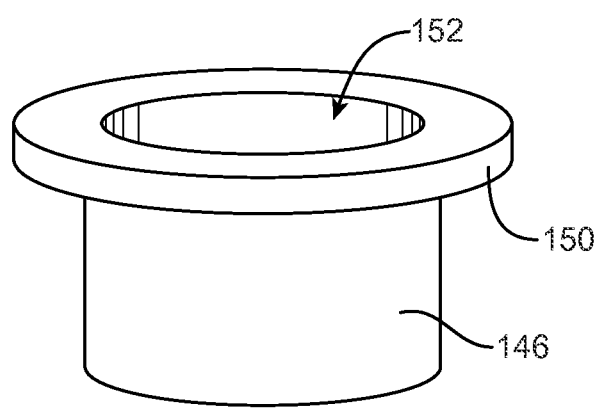
FIG. 15 is a perspective view of a camera window sleeve of the type that may be used in a camera mounting arrangement of the type shown in FIG. 14 in accordance with an embodiment of the present invention.

Transparent material 148 (e.g., a polymer, glass, ceramic, etc.) may be used to fill the cavity within sleeve 146 if desired. Sleeve 146 may be formed from metal, plastic, or other suitable materials. Sleeve 146 may be provided with a flange structure such as flange 150 to help attach sleeve 146 to display 14 (e.g., using an adhesive layer under flange 150). A perspective view of an illustrative sleeve such as sleeve 146 of FIG. 14 is shown in FIG. 15. As shown in FIG. 15, sleeve 146 may have a cylindrical shape with a central cylindrical opening 150. Other shapes may be used to form sleeve 146 if desired.

Figure 16:
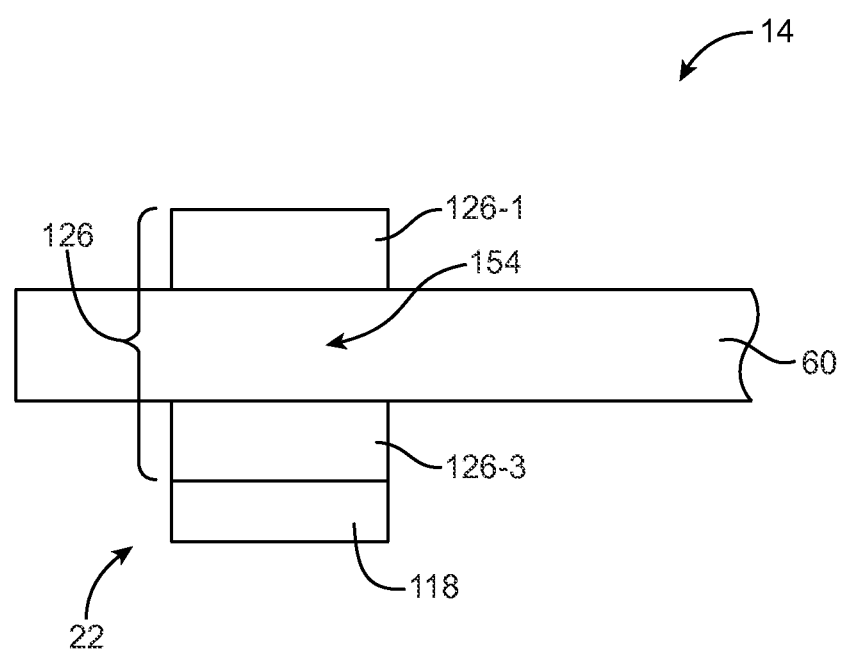
FIG. 16 is a cross-sectional side view of a camera mounted in an electronic device so that part of the lens structures of the camera are mounted above a color filter layer and part of the lens structures of the camera are mounted below the color filter layer in accordance with an embodiment of the present invention.

A cross-sectional side view of a portion of display 14 showing how lens structures 126 may include a portion of color filter layer 60 is shown in FIG. 16. As shown in FIG. 16, lens structure 126 in camera 22 may include upper lens structures 126-1 and lower lens structures 126-3. Portion 154 of color filter layer 60 may be interposed between structures 126-1 and 126-3 and may serve as layer 126-2 of lens structures 126 of FIG. 8.

Figure 17:
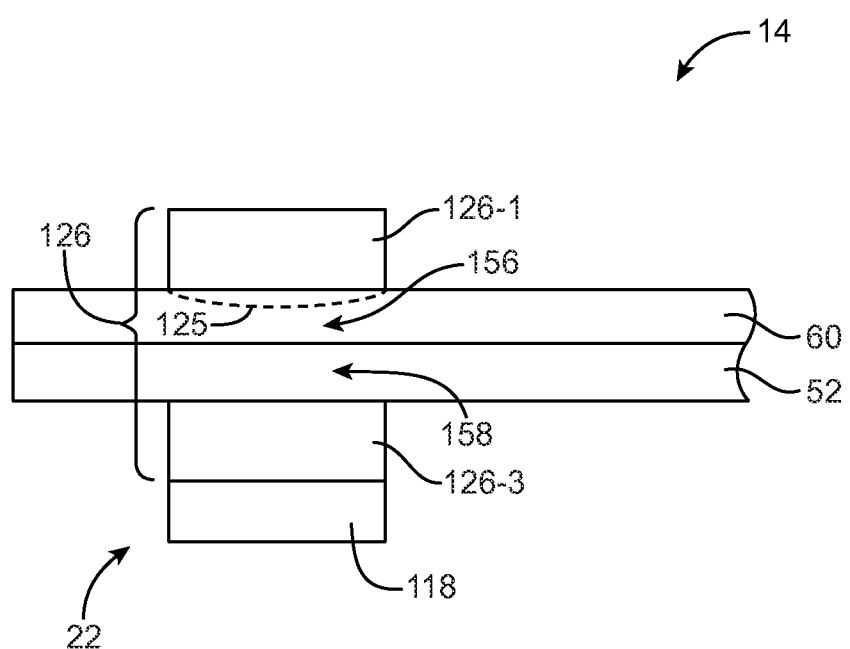
FIG. 17 is a cross-sectional side view of a camera mounted in an electronic device so that part of the lens structures of the camera are mounted above a color filter layer and an associated thin-film-transistor layer and part of the lens structures of the camera are mounted below the color filter layer and the thin-film-transistor layer in accordance with an embodiment of the present invention.

FIG. 17 is a cross-sectional side view of a portion of display 14 in a configuration in which lens structures 126 include portions of color filter layer 60 and thin-film transistor layer 52. As shown in FIG. 17, lens structures 126 for camera 22 may include layer 60 and layer 52. Portion 156 of layer 60 and portion 158 of layer 52 may be interposed between upper lens structures 126-1 and lower lens structures 126-3 and may form part of lens structures 126. If desired, display structures such as portions 156 and 158 may have concave or convex surfaces to help focus image light for camera 22, as indicated by optional curved color filter surface 125 in FIG. 17.

Figure 18:
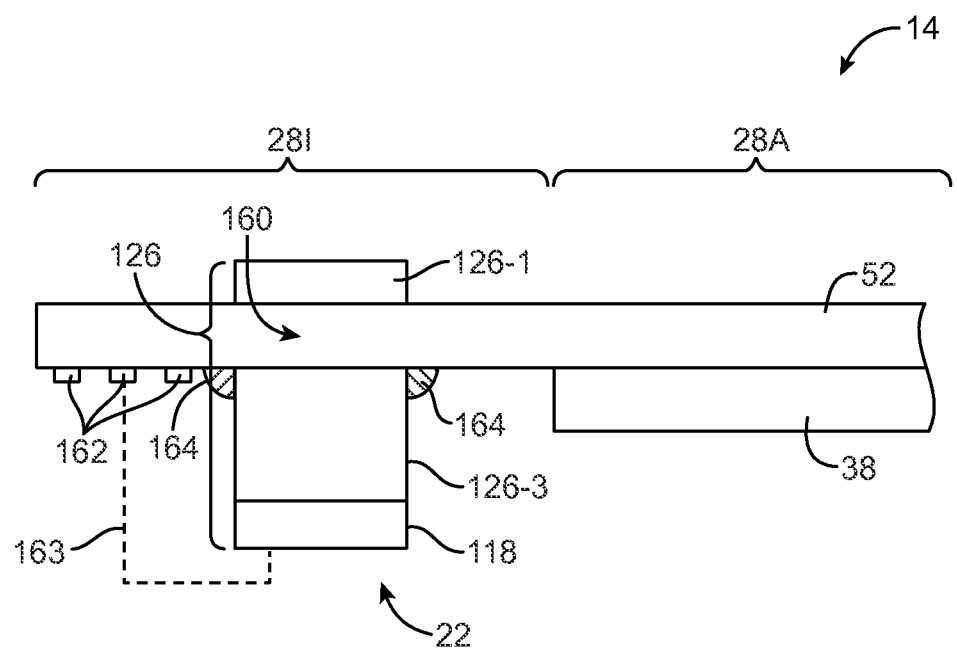
FIG. 18 is a cross-sectional side view of a camera mounted in an electronic device so that part of the lens structures of the camera are mounted above a thin-film-transistor layer and part of the lens structures of the camera are mounted below the thin-film-transistor layer in accordance with an embodiment of the present invention.

As shown in FIG. 18, thin-film-transistor layer 52 may be the only layer that is interposed within lens structures 126. With arrangements of the type shown in FIG. 18, part of thin-film-transistor layer 52 such as portion 160 may be interposed between upper lens structures 126-1 and lower lens structures 126-3 in lens structures 126. Mounting structures 164 such as adhesive, bracket structures, or other structures may be used to help hold lens structures 126 in place on thin-film-transistor layer 52. Backlight unit 38 may be used to provide illumination for active region 28A of display 14. If desired, conductive traces such as traces 162 may be formed on thin-film-transistor layer 52. Traces 162 may, for example, be formed on the underside of layer 52 in inactive peripheral display region 28I. Traces 162 may be used to form interconnect structures for routing signals to and from camera 22. A flex circuit or other path may be used to interconnect camera electronics such as image sensor circuitry 118 and traces 162, as illustrated by path 163.

Figure 19:
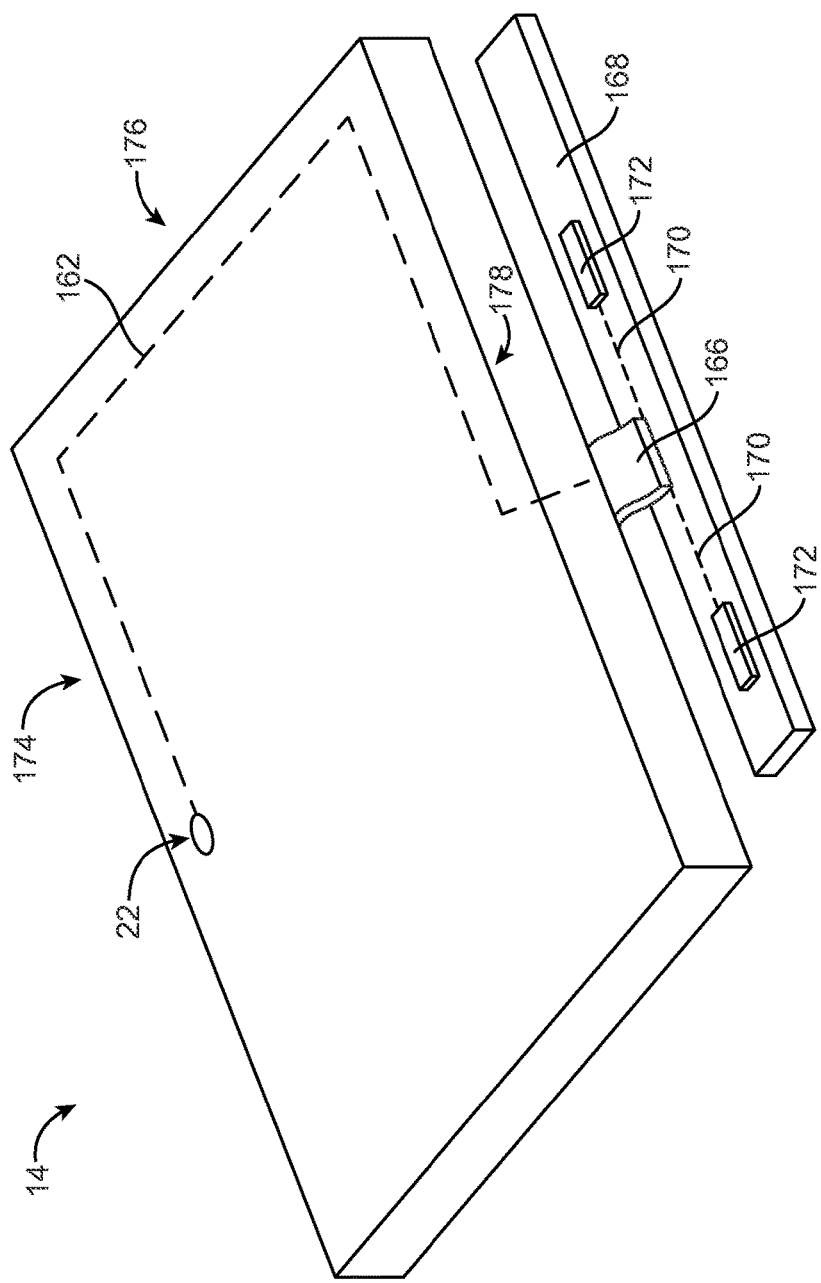
FIG. 19 is a perspective view of a display showing how interconnect lines that route signals between a printed circuit board and a camera may be routed along peripheral regions of a display such as peripheral regions on the edge of a thin-film-transistor layer of the type shown in FIG. 18 in accordance with an embodiment of the present invention.

FIG. 19 is a perspective view of display 14 showing how traces 162 may run along the peripheral edges of display 14. In this type of configuration, traces 162 may form a signal bus that runs along upper edge 174, right-hand edge 176, and lower edge 178 of display 14 (e.g., on the lower surface of thin-film-transistor layer 52, as shown in FIG. 18). A flex circuit such as flex circuit 166 may interconnect traces 162 on the underside of the thin-film-transistor layer in display 14 of FIG. 19 to traces 170 on printed circuit board 168. Printed circuit board 168 may be, for example, a driver board on which integrated circuits 172 for driving display 14 are located. Signals from path 162 may be routed to integrated circuits such as integrated circuits 172 via flex circuit 166 and traces 170. Integrated circuits 172 may include integrated circuits for processing camera signals from camera 22. Printed circuit board 168 may be connected to other printed circuit boards in device 10 such as a main logic board.

Figure 20:
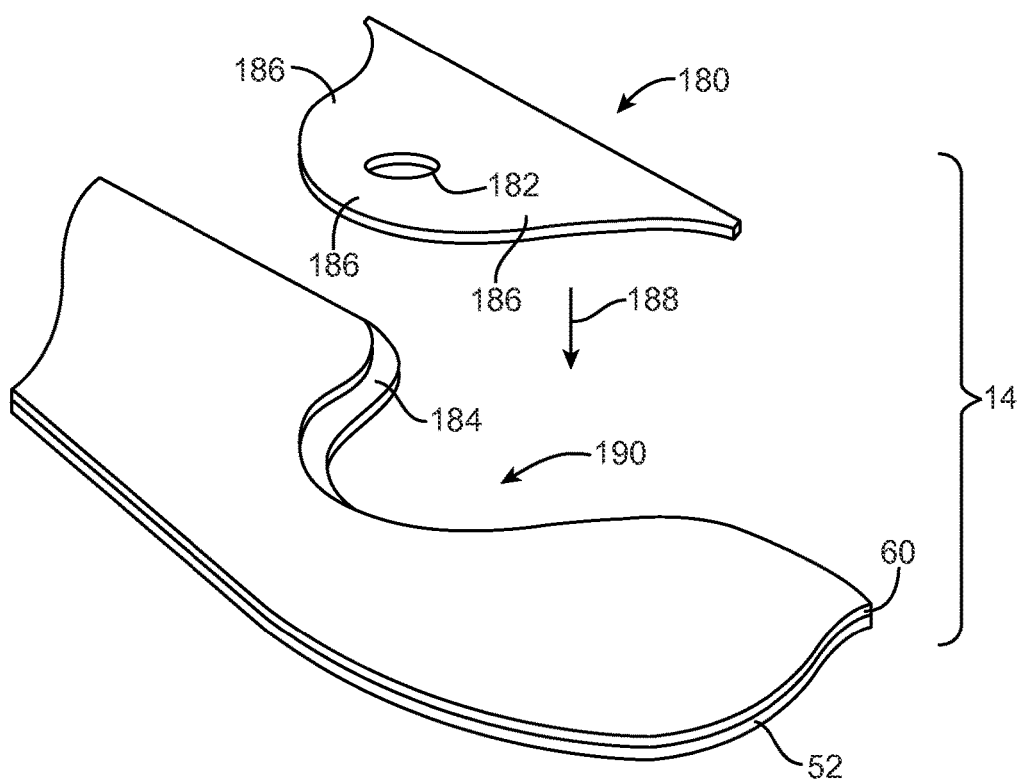
FIG. 20 is an exploded perspective view of an edge of part of a display showing how a planar insert with a camera opening may be mounted to display layers such as a color filter layer and a thin-film-transistor layer in accordance with an embodiment of the present invention.

If desired, a layer of material such as insert layer 180 of FIG. 20 may be included in display 14. Insert 180 may have a camera window such as camera window 182. Camera window 182 may be formed from a clear solid structure (e.g., a transparent portion of insert layer 180) or may be formed from an opening that passes through layer 180 (e.g., a circular opening in layer 180). Camera 22 may be mounted under window 182 and may receive image light through window 182. With an arrangement of the type shown in FIG. 20, opening 190 in thin-film-transistor layer 184 and color filter layer 60 has a mouse-hole notch shape that matches the shape of insert 180. In the vicinity of notch 190, the edge of color filter layer 60 may be recessed slightly from the edge of thin-film-transistor layer 52 (or vice versa) to form ledge (shelf) 184. Opening 190 may have a curved shape, a shape with straight edges (e.g., part of a rectangle), or other suitable shapes. Ledge 184 may run along the edge of opening 190. Edge portions 186 of insert 180 may be mounted on ledge 184 using adhesive when insert 180 is inserted within opening 190 in direction 188.

Insert 180 may be formed from metal, plastic, ceramic, or other suitable materials. With one suitable arrangement, insert 180 may be formed from a material that has a coefficient of thermal expansion that is matched to the materials used in forming layers 52 and 60 to prevent thermal mismatch. As an example, in configurations in which layers 52 and 60 are formed from glass, insert 180 may be formed from glass. Camera 22 (i.e., base 124 and lens structures 126) may be mounted in alignment with camera window 182. For example, lens structures 126 may be mounted under window 182 (e.g., an opening in layer 180).

Figure 21:
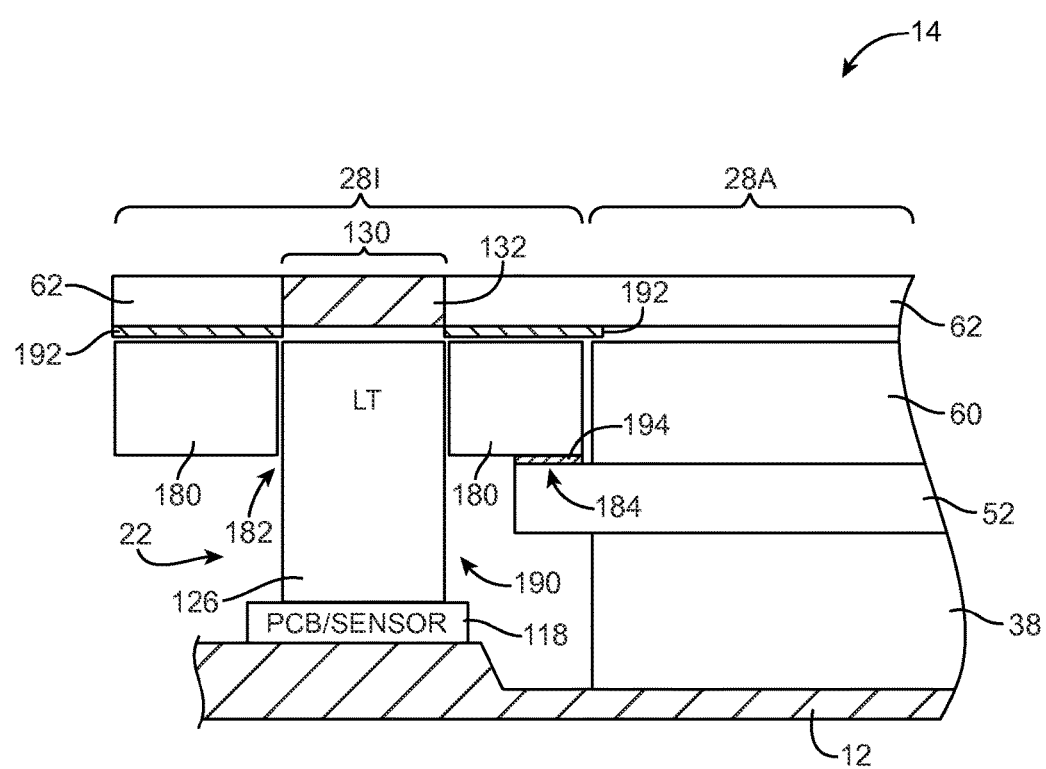
FIG. 21 is a cross-sectional side view of display structures in an electronic device showing how the lens of a camera may be mounted through an opening such as the opening in the planar insert of FIG. 20 in accordance with an embodiment of the present invention.

FIG. 21 is a cross-sectional side view of display 14 showing how camera 22 may be mounted so that part of lens structures 126 pass through opening 182 in insert layer 180 within opening 190. Opening 190 of FIG. 21 may be a notch-shaped opening or may be an elongated opening to accommodate a strip-shaped insert layer. As shown in FIG. 21, camera 22 may be mounted on housing 12 or may be mounted on other support structures within device 10. Backlight unit 38 may be used to illuminate active region 28A of display 14. Camera 22 may be mounted in alignment with camera window 130 in polarizer 62 within inactive display region 28I.

Opaque masking layer 192 on polarizer 62 may be patterned to form an opening that is aligned with camera window 130 and depolarized material 132 in polarized layer 62. Adhesive such as adhesive 194 may be used to attach insert 180 to ledge 184 on thin-film-transistor layer 52.

Figure 22:
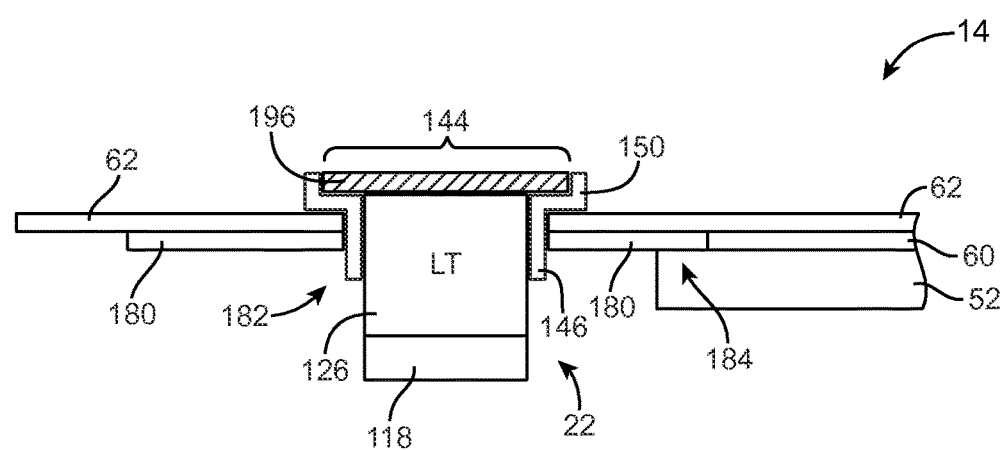
FIG. 22 is a cross-sectional side view of an illustrative display mounting arrangement in which an opening has been formed through a polarizer layer and a planar insert to accommodate the lens of a camera in accordance with an embodiment of the present invention.

FIG. 22 is a cross-sectional side view of display 14 showing how lens structures 126 may be mounted within a sleeve such as sleeve 146 that passes through an opening within polarizer 62. Insert 180 may have an opening such as opening 182 that is aligned with the opening in polarizer 62. Sleeve 146 may have a flange structure such as flange 150 that is mounted onto the upper surface of polarizer 62. Opening 144 may form a camera window for camera 22. A transparent structure such as a glass window or other clear member (member 196) may be mounted within sleeve 146 and opening 144. Lens structures 126 of camera 22 may be mounted within sleeve 146. Insert 180 may be mounted to ledge 184 of thin-film-transistor layer 52 adjacent to color filter layer 60.

Figure 23:
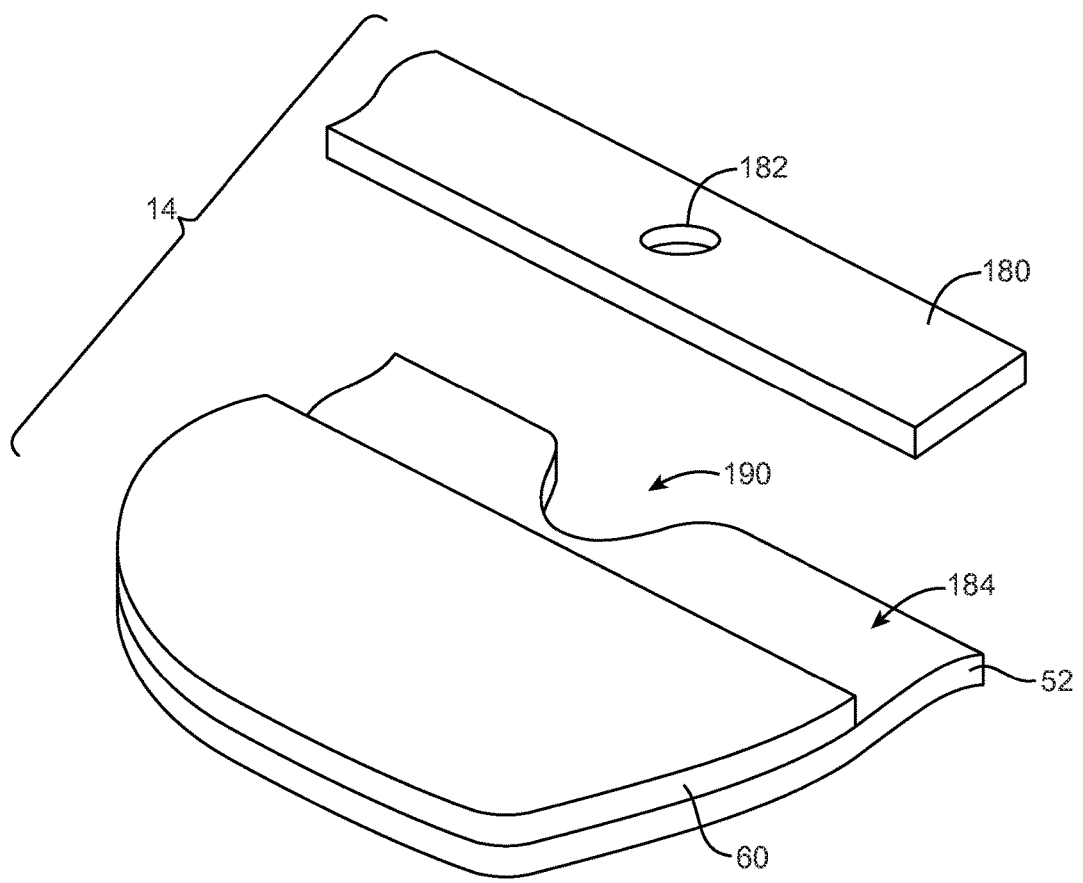
FIG. 23 is an exploded perspective view of an edge portion of a display showing how an elongated rectangular planar insert with a camera opening may be mounted to display layers such as a color filter layer and a thin-film-transistor layer in accordance with an embodiment of the present invention.

If desired, insert 180 may have an elongated planar strip shape, as shown in FIG. 23. Ledge 184 may be substantially straight and may be formed by aligning the edges of color filter layer 60 and thin-film-transistor layer 54 so that the edge of color filter layer 60 is recessed with respect to the edge of thin-film-transistor layer 54. When mounting elongated insert 180 to straight ledge 184 using adhesive, arrangements of the type shown in FIG. 23 may provide a relatively large amount of surface area between insert 180 and thin-film-transistor layer 52. This may facilitate attachment and reduce the likelihood that insert 180 could be accidentally dislodged from display 14. In the example of FIG. 23, insert 180 has the shape of an elongated strip of material. Other elongated shapes may be used if desired. Opening 182 may be formed in a portion of insert 180 that allows opening 182 to be aligned with an opening such as notch 190 in thin-film transistors layer 52. Camera 22 may be mounted under opening 182 so that lens structures 126 of camera 22 pass through opening 190 (as an example).

Figure 24:
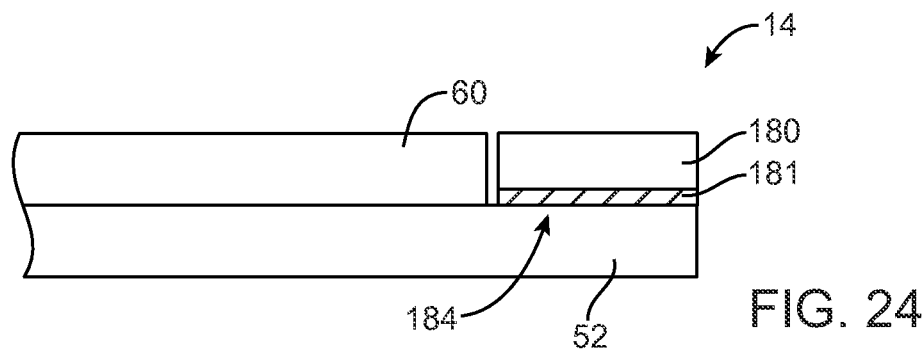
FIG. 24 is a cross-sectional side view of a portion of a display in which a planar insert with a camera window has been mounted in accordance with an embodiment of the present invention.

A cross-sectional side view of display 14 showing how insert 180 may be mounted onto ledge 184 on thin-film-transistor layer 52 adjacent to color filter layer 60 using adhesive 181 is shown in FIG. 24. If desired, insert 180 may have the same thickness as color filter layer 60 to avoid creating visible and potentially unsightly steps in height on the surface of color filter layer 60.

Figure 25:
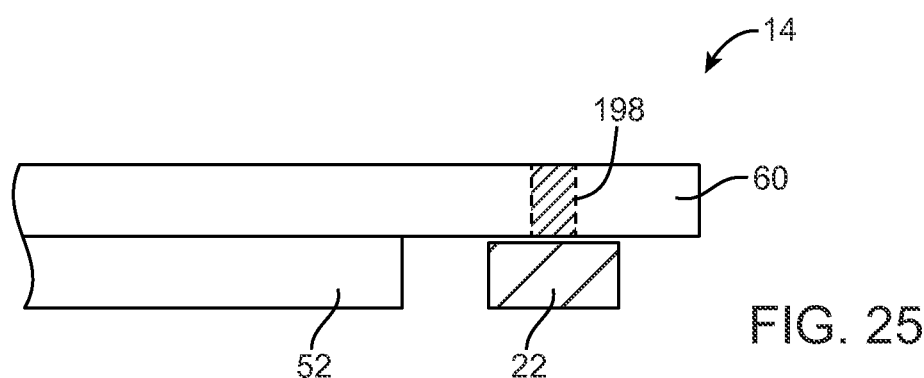
FIG. 25 is a cross-sectional side view of a portion of a display showing how a camera window may be formed in a color filter layer in accordance with an embodiment of the present invention.
Figure 26:
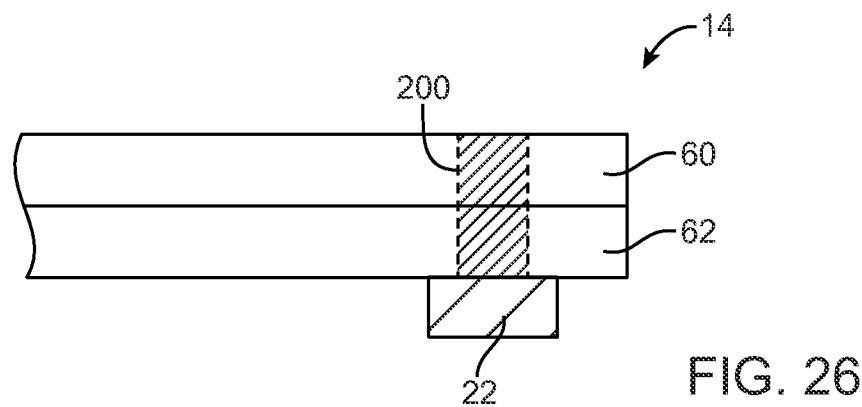
FIG. 26 is a cross-sectional side view of a portion of a display showing how a camera window may be formed through a color filter layer and a thin-film transistor layer in accordance with an embodiment of the present invention.

If desired, color filter layer 60 may be provided with a camera region such as window region 198 of FIG. 25 (e.g., an opening or a region that is devoid of all or substantially all light-blocking structures and color filter element structures). Camera 22 and lens structures 126 in camera 22 may be mounted to the lower surface of color filter layer 60 in alignment with window region 198. As shown in FIG. 26, color filter layer 60 and thin-film-transistor layer 62 may be provided with region 200 (e.g., an opening or a clear region that does not significantly block light and that can serve as a camera window for device 10). Camera 22 and lens structures 126 in camera 22 may be mounted in alignment with camera window 200.

Figure 27:
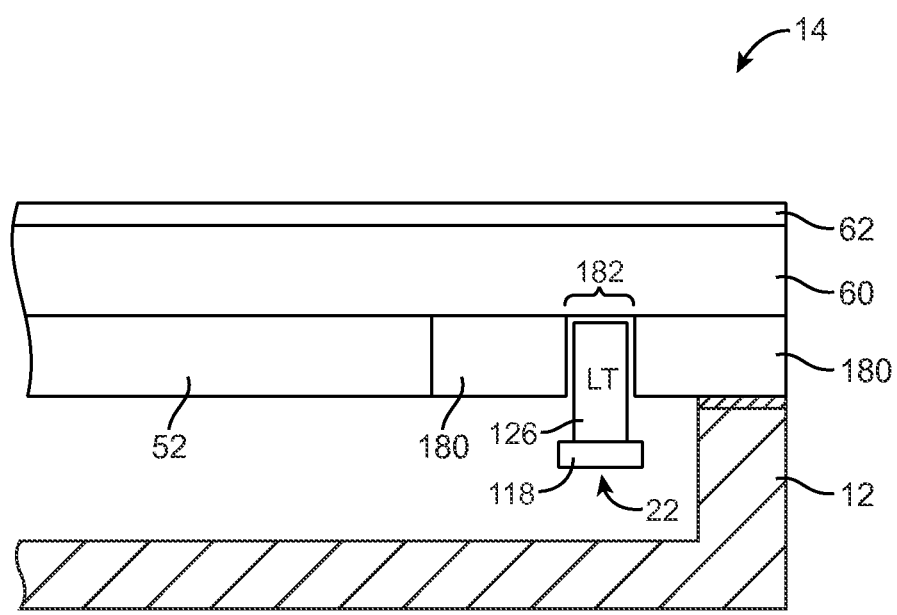
FIG. 27 is a cross-sectional side view of a portion of an electronic device showing how a camera may be mounted so that a lens portion of the camera protrudes through an opening in a planar insert that is attached to a color filter layer and thin-film-transistor layer in accordance with an embodiment of the present invention.

As shown in the cross-sectional side view of FIG. 27, insert 180 may be mounted so that camera window 182 is covered by color filter layer 60. In this type of configuration, notch shape 190 (FIG. 23) may extend only through thin-film-transistor layer 52 and not color filter layer 60. As a result, camera 22 may be mounted so that a portion of lens structures 126 passes through opening 182 in window camera and rests adjacent to the overlapping portion of color filter layer 60. Color filter layer 60 may have a clear portion (see, e.g., portion 198 of FIG. 14) through which light passes to reach the image sensor in camera 22.

The foregoing is merely illustrative of the principles of this invention and various modifications can be made by those skilled in the art without departing from the scope and spirit of the invention.

What is claimed is:

1. An electronic device, comprising:
   a display having a plurality of layers comprising at least one thin-film transistor layer; and
   a camera comprising lens structures and an image sensor that receives light through the lens structures, wherein at least part of the camera extends partially through the at least one thin-film transistor layer, wherein the camera is below at least one of the plurality of layers, wherein at least one of the plurality of layers comprises a polarizer layer having a window, wherein the polarizer layer is formed from a first material and processed in a manner to have a polarizing property, and wherein the window is formed from the first material and processed in a manner to remove the polarizing property.

2. The electronic device of claim 1, further comprising traces on the at least one thin-film-transistor layer that are electrically connected to the camera and that run along a plurality of edges of the at least one thin-film-transistor layer.

3. The electronic device of claim 1, wherein the camera is mounted within the display with an adhesive fastener.

4. The electronic device of claim 1, wherein at least part of the camera extends entirely through the at least one thin-film transistor layer.

5. The electronic device of claim 1, wherein the lens structures comprise a lens train.

6. The electronic device of claim 1, wherein the camera is mounted along an edge of the at least one thin-film transistor layer.

7. The electronic device of claim 1, wherein at least one of the plurality of layers comprises a color filter layer.

8. The electronic device of claim 7, wherein at least part of the camera extends partially through the color filter layer.

9. The electronic device of claim 7, wherein the camera is not in direct contact with the color filter layer.

10. The electronic device of claim 7, wherein at least a portion of the color filter layer is devoid of colored filter elements.

11. The electronic device of claim 7, wherein the polarizer layer is on top of the color filter layer, and wherein the color filter layer is on top of the at least one thin-film transistor layer.

12. The electronic device of claim 1, wherein the camera is aligned coaxially with the window.

* * * * *